US012636733B2

(12) United States Patent
Ting et al.

(10) Patent No.: US 12,636,733 B2
(45) Date of Patent: May 26, 2026

(54) SYSTEMS AND METHODS FOR FORMATION OF CONTINUOUS CHANNELS WITHIN TRANSPARENT MATERIALS

(71) Applicant: Avava, Inc., Waltham, MA (US)

(72) Inventors: Joseph Ting, Acton, MA (US); Charles Holland Dresser, Wayland, MA (US)

(73) Assignee: Avava, Inc., Waltham, MA (US)

( * ) Notice: Subject to any disclaimer, the term of this patent is extended or adjusted under 35 U.S.C. 154(b) by 849 days.

(21) Appl. No.: 17/118,047

(22) Filed: Dec. 10, 2020

(65) Prior Publication Data

US 2021/0187668 A1     Jun. 24, 2021

Related U.S. Application Data

(60) Provisional application No. 62/951,473, filed on Dec. 20, 2019.

(51) Int. Cl.
| | |
|---|---|
| *B23K 26/55* | (2014.01) |
| *B23K 26/00* | (2014.01) |
| *B23K 26/0622* | (2014.01) |
| *B23K 26/064* | (2014.01) |
| *B23K 26/082* | (2014.01) |
| *B23K 26/12* | (2014.01) |
| *B23K 26/142* | (2014.01) |
| *B23K 26/146* | (2014.01) |
| *B23K 26/57* | (2014.01) |
| *B23K 103/00* | (2006.01) |

(52) U.S. Cl.
CPC ........... *B23K 26/57* (2015.10); *B23K 26/009* (2013.01); *B23K 26/0624* (2015.10); *B23K 26/0648* (2013.01); *B23K 26/082* (2015.10);

*B23K 26/1224* (2015.10); *B23K 26/142* (2015.10); *B23K 26/146* (2015.10); *B23K 2103/42* (2018.08); *B23K 2103/54* (2018.08)

(58) Field of Classification Search
CPC .. B23K 26/57; B23K 26/009; B23K 26/0624; B23K 26/0648; B23K 26/082; B23K 26/1224; B23K 26/142; B23K 26/146; B23K 2103/42; B23K 2103/54; B23K 26/16; B23K 26/55; B23K 26/702
USPC ........................................ 219/121.68, 69, 73
See application file for complete search history.

(56) References Cited

U.S. PATENT DOCUMENTS

| | | | |
|---|---|---|---|
| 4,916,284 A | 4/1990 | Petrick | |
| 9,290,008 B1 * | 3/2016 | Li ......................... | B23K 26/356 |
| 2005/0064137 A1 * | 3/2005 | Hunt .................... | B23K 26/361 |
| | | | 428/188 |
| 2006/0124618 A1 * | 6/2006 | Sugioka ............. | B23K 26/0624 |
| | | | 219/121.73 |

(Continued)

OTHER PUBLICATIONS

International Search Report and Written Opinion issued in corresponding International Application No. PCT/US20/64262, dated Mar. 2, 2021, 9 pages.

*Primary Examiner* — Tiffany T Tran
(74) *Attorney, Agent, or Firm* — William C. Geary

(57) ABSTRACT

A system and method for producing continuous channels within a transparent material is disclosed. According to one embodiment, the system and method includes forming a channel with a laser beam, such that the continuous channel has at least one vent from the channel to outside the transparent material.

15 Claims, 21 Drawing Sheets

(56) References Cited

U.S. PATENT DOCUMENTS

| | | | |
|---|---|---|---|
| 2006/0219676 A1* | 10/2006 | Taylor ................... | G02B 6/1225 |
| | | | 219/121.69 |
| 2009/0045179 A1* | 2/2009 | Williams ............. | B23K 26/364 |
| | | | 219/121.72 |
| 2012/0037181 A1* | 2/2012 | Jia ........................ | B23K 26/364 |
| | | | 134/1 |
| 2013/0196426 A1* | 8/2013 | Nukaga ............ | G01N 33/48728 |
| | | | 422/69 |
| 2014/0017447 A1* | 1/2014 | Kondo .................... | C30B 29/20 |
| | | | 428/141 |
| 2016/0129526 A1* | 5/2016 | Russ .................... | B23K 26/352 |
| | | | 264/400 |
| 2018/0215648 A1 | 8/2018 | Wada et al. | |
| 2020/0055146 A1* | 2/2020 | Maeda ............. | G05B 19/40937 |

\* cited by examiner

*100*

SYSTEMS AND METHODS FOR FORMATION OF CONTINUOUS CHANNELS WITHIN TRANSPARENT MATERIALS

CROSS-REFERENCE TO RELATED APPLICATIONS

This application claims the benefit of U.S. Provisional Patent Application No. 62/951,473, filed on Dec. 20, 2019, entitled "Systems And Methods For Formation Of Continuous Channels Within Transparent Materials," the entirety of which is incorporated by reference herein.

BACKGROUND

Plastic microfluidic chips can be produced using fabrication processes which produce two dimensional structures in thermoplastic materials using methods such as hot embossing, injection molding, or casting. These structures may include multiple narrow channels and other features which may be closely spaced. An example of a chip which was designed to collect circulating tumor cells from whole blood is shown in FIGS. 1A-B. The chip has ~1.5 million microfabricated features with characteristic widths between 12 $\mu$m-50 $\mu$m. The structures are produced in thin layers which are bonded together to form a sandwich as illustrated in FIG. 2. The bond must seal the layers together while keeping individual structures separate.

Microfluidic chips can be produced through photolithographic techniques and the resulting tooling (like that for the chip shown in FIGS. 1A-B) can be very complex, expensive, and time consuming to produce. The need for complex tooling can increase financial costs in production phases and time costs in prototyping and design phases.

Ports between individual layers in the microfluidic chip can be drilled before the individual layers are consolidated and bonded together. This can limit current microfluidic chip design to 2-dimensional (2D) patterns.

Bonding (or lidding) different layers of the microfluid chip together can be difficult. Bonding can be done with a combination of solvent, heat and pressure. As a result of the complexities of the bonding process, an intended seal between multiple adjacent features can fail. For example, the intended seal can fail due to leaks between structures or due to fused structures that prevent free flow.

As a result, producing microfluidic chips can be time consuming, expensive and can exhibits a low yield. For the above reasons, improved methods and systems for producing microfluidic chips are sought.

SUMMARY

An embodiment of a method for forming a continuous channel in a transparent material includes: generating, using a laser source, a laser beam; converging, using a focus optic, the laser beam to a focal region outside of a transparent material; moving the focal region from outside the transparent material to inside the transparent material along a first scan path; and, forming a continuous channel within the transparent material generally along the first scan path, wherein the continuous channel has a vent to outside of the transparent material located at least at one end.

In some embodiments, the method also includes moving the focal region from inside the transparent material to outside the transparent material along a continuation of the first scan path; and elongating the continuous channel within the transparent material generally along the continuation of the first scan path, such that the continuous channel has a vent to outside the transparent material at least two ends.

In some embodiments, the method also includes moving the focal region along a second scan path that is substantially parallel to and separated by a separation distance from the first scan path, wherein the separation distance is based upon a width of the focal region; and, widening a width of the continuous channel. In some versions, the separation distance is substantially along one or more of 3 mutually orthogonal axes: a lateral (X) axis, a horizontal (Y) axis, and a vertical (Z) axis. In some versions, the separation distance is between about 1 and 100 micrometers.

In some embodiments of the method, the method also includes removing ablation product from within the continuous channel. In some versions, removing ablation product includes using a solution, wherein the solution has a pH that is complementary or neutral to a pH of the ablation product. In some versions, removing ablation product from within the continuous channels includes using an ultrasonic cleaner.

In some embodiments of the method, the method also includes pulsing the laser source and the laser beam has a pulse repetition rate of at least about 1 kHz. In some versions, the laser beam has a pulse duration no greater than about 1 nanosecond.

In some embodiments of the method, the transparent material comprises at least one of: General Purpose Polystyrene (GPPS), Methylmethacrylate Acrylonitrile Butadiene Styrene (MABS), Styrene acrylonitrile (SAN), Styrene Methyl Methacrylate (SIVIMA), Methacrylate Butadiene Styrene (MBS), Styrene-butadiene (SB) Copolymer, Polycarbonate (PC), High Heat Polycarbonate (HH PC), Polyethylene Terephthalate (PET), Glycol-Modified Polyethylene Terephthalate (PET-G), Poly(Methyl Methacrylate) (PMMA), Polyethyleneimine (PEI), Polyethersulfone (PES), Polysulfone (PSU), Polypropylene Homopolymer (PP H), Random Copolymerized Polypropylene (PP R), Low-Density Polyethylene (LDPE), Polylactic Acid (PLA), glass, Styrene-Ethylene/Butylene-Styrene (SEBS), Thermoplastic Polyurethane (TPU), Thermoplastic Olefin (TPO), crystal, sapphire, and quartz.

In some embodiments of the method, converging the laser beam is done at a numerical aperture (NA) of at least about 0.3.

In some embodiments of the method, the laser beam has a wavelength in a range between about 400 and 4000 nanometers.

In some embodiments of the method, the method additionally includes introducing a vacuum to the continuous channel by way of one or more vents.

In some embodiments of the method, the scan path at a first surface of the transparent material is generally normal to the first surface of the transparent material.

An embodiment of a system for forming a continuous channel in a transparent material includes: a laser source, a focus optic, one or more translation stages, and a controller. The laser source is configured to generate a laser beam. The focus optic is configured to converge the laser beam to a focal region that is initially located outside of the transparent material. The one or more translation stages are configured to move the focal region from outside the transparent material to inside the transparent material along a first scan path, either by moving the material relative to the stationary laser focal region or by moving the laser focal region relative to the stationary material or some combination of the two. And, the controller is configured to control at least one of the laser source and the one or more translation stages to form a continuous channel within the transparent material gener-ally along the first scan path, wherein the continuous channel has a vent to outside the transparent material located at least at one end.

In some embodiments of the system, the controller is further configured to control the at least one translation stage to move the focal region from inside the transparent material to outside the transparent material along a continuation of the first scan path to elongate the continuous channel within the transparent material generally along the continuation of the first scan path, such that the continuous channel has a vent to outside the transparent material at least at two ends.

In some embodiments of the system, the controller is further configured to control the at least one translation stage to move the focal region along a second scan path that is substantially parallel to and separated by a separation dis-tance from the first scan path to widen a width of the continuous channel, wherein the separation distance is based upon a width of the focal region. In some versions, the separation distance is substantially along one or more of 3 mutually orthogonal axes, including: a lateral axis (X), a horizontal axis (Y), and a vertical axis (Z). In some versions, the separation distance is between about 1 and 100 microm-eters.

In some embodiments of the system, the system addition-ally includes an ablation product removal system that is configured to remove an ablation product from within the continuous channel. In some versions, the ablation product removal system includes a solution; wherein, the solution has a pH that is complementary or neutral to a pH of the ablation product. In some versions, the ablation product removal system comprises an ultrasonic cleaner.

In some embodiments of the system, the laser beam is pulsed at a repetition rate of at least about 1 KHZ. In some versions, the laser beam has a pulse duration that is no greater than about 1 nanosecond.

In some embodiments of the system, the transparent material includes at least one of: General Purpose Polysty-rene (GPPS), Methylmethacrylate Acrylonitrile Butadiene Styrene (MABS), Styrene acrylonitrile (SAN), Styrene Methyl Methacrylate (SMIMA), Methacrylate Butadiene Styrene (MBS), Styrene-butadiene (SB) Copolymer, Poly-carbonate (PC), High Heat Polycarbonate (HH PC), Poly-ethylene Terephthalate (PET), Glycol-Modified Polyethyl-ene Terephthalate (PET-G), Poly(Methyl Methacrylate) (PMMA), Polyethyleneimine (PEI), Polyethersulfone (PES), Polysulfone (PSU), Polypropylene Homopolymer (PP H), Random Copolymerized Polypropylene (PP R), Low-Density Polyethylene (LDPE), Polylactic Acid (PLA), glass, Styrene-Ethylene/Butylene-Styrene (SEBS), Thermo-plastic Polyurethane (TPU), Thermoplastic Olefin (TPO), crystal, sapphire, and quartz.

In some embodiments of the system, wherein the focus optic is further configured to converge the laser beam at a numerical aperture of at least about 0.3.

In some embodiments of the system, the laser beam has a wavelength in a range of between about 400 and 4000 nanometers.

In some embodiments of the system, the system addition-ally includes a vacuum system, configured to introduce a vacuum to the continuous channel by way of one or more vents.

In some embodiments of the system, the scan path at a first surface of the transparent material is generally normal to the first surface of the transparent material.

BRIEF DESCRIPTION OF THE DRAWINGS

Embodiments of the disclosure will be more fully under-stood from the following detailed description taken in con-junction with the accompanying drawings, in which.

It is noted that the drawings are not necessarily to scale. The drawings are intended to depict only typical aspects of the subject matter disclosed herein, and therefore should not be considered as limiting the scope of the disclosure. The systems, devices, and methods specifically described herein and illustrated in the accompanying drawings are non-limiting exemplary embodiments.

DETAILED DESCRIPTION

Figure 1A:
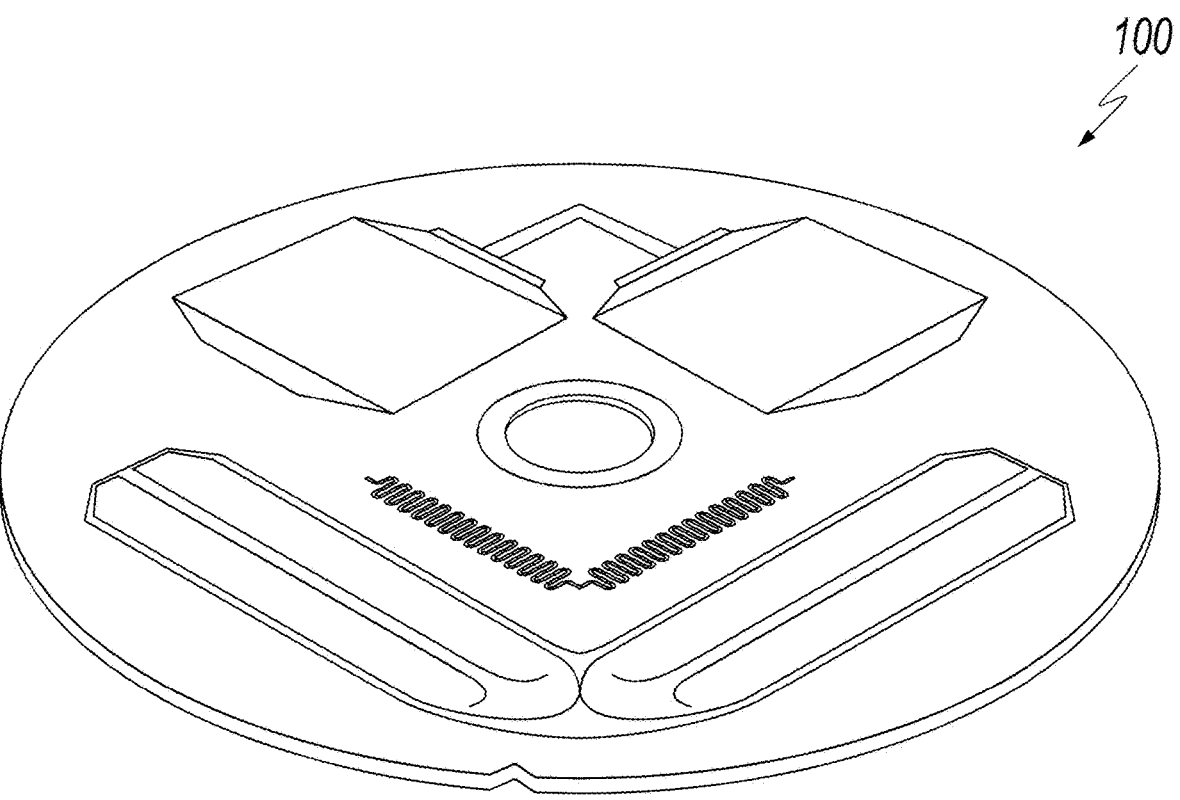
FIG. 1A displays a state-of-the-art macroscopic view of a microfluidic chip.
Figure 1B:
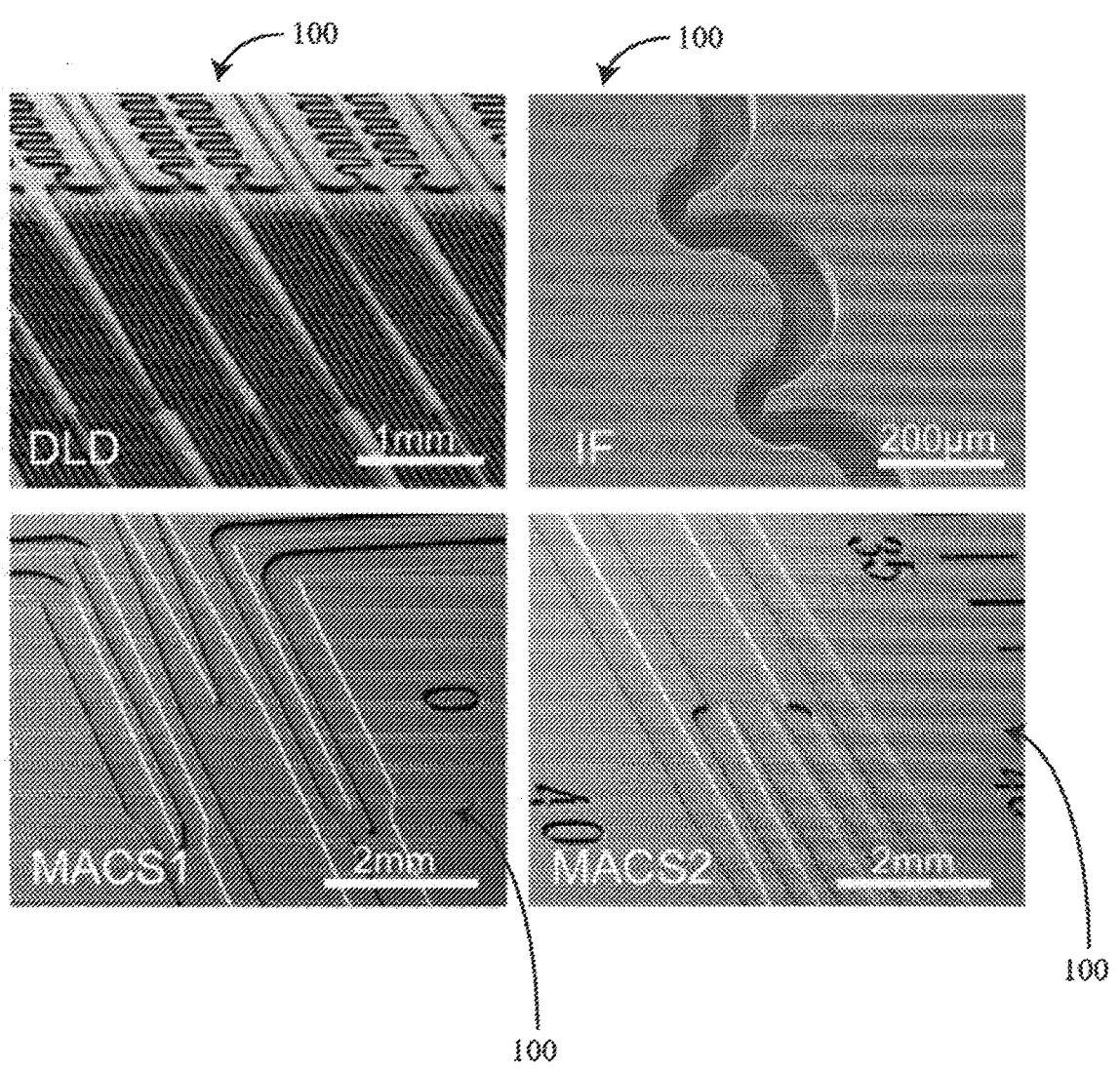
FIG. 1B displays multiple microscopic views of the microfluidic chip of FIG. 1A.

As described above FIGS. 1A-B represent a microfluidic chip 100 produced using state-of-the-art methods. Specifically, this microfluidic chip 100 is a multi-stage CTC iChip developed by Massachusetts General Hospital. The CTC iChip 100 has approximately 1.5 million microfabricated features (12 μm-50 μm). The CTC iChip 100 is designed to separate circulating tumor cells from whole blood.

Figure 2:
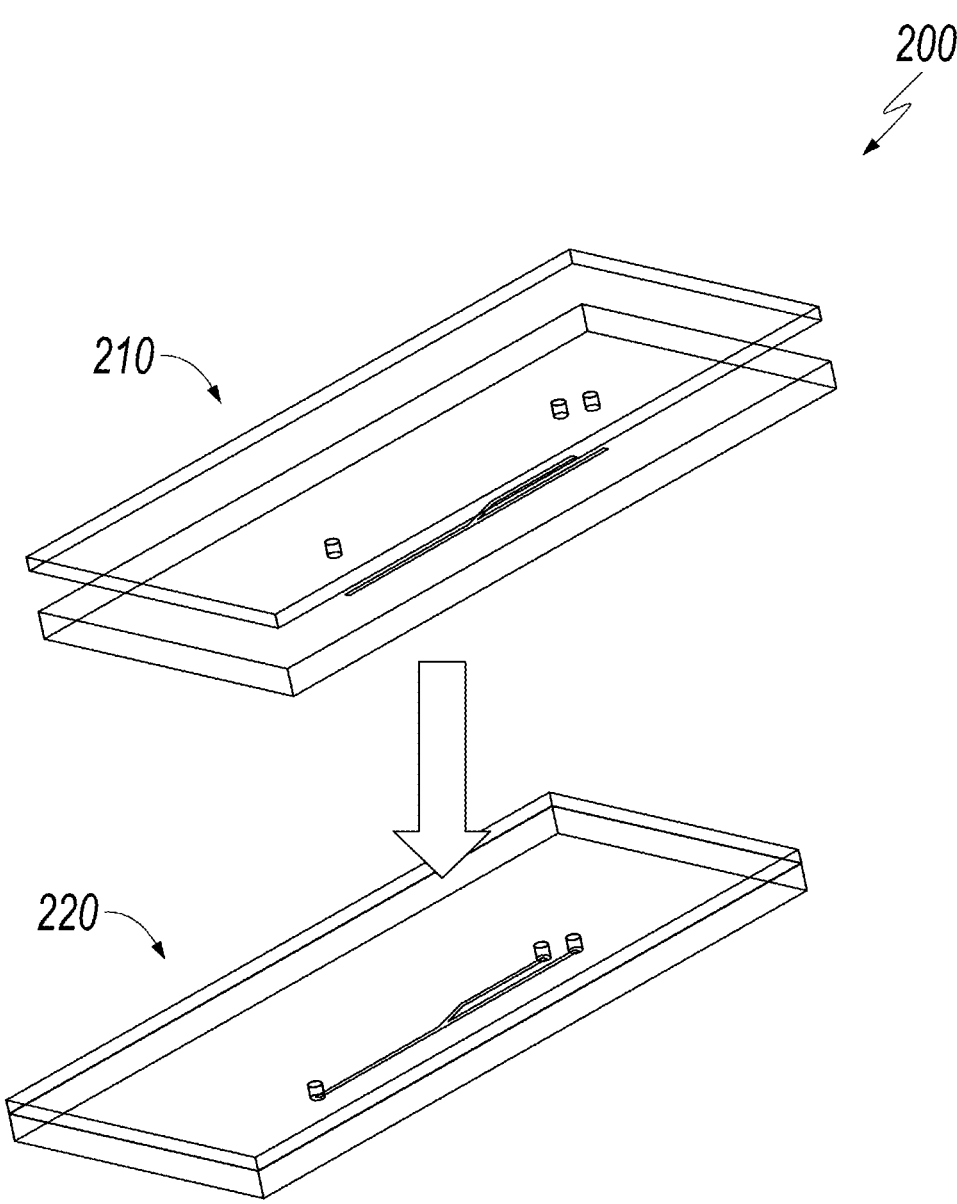
FIG. 2 illustrates a state-of-the-art bonding process for microfluidic chips.

Referring again to FIG. 2, a conventional bonding process 200 is shown depicting a near final step of the of the current microfluidic device manufacturing process. An unbonded configuration 210 is shown at the top of FIG. 2. The unbonded configuration 210 undergoes a bonding process 200 and results in a bonded configuration 220 for the microfluidic chip. The bonding process can involve one or more of solvents, adhesives, elevated temperatures, and applied pressure. As described above, the bonding process 200 for current microfluidic fabrication techniques can be a common source of error and contributes to an overall low yield for current microfluidic manufacturing processes. The present invention addresses this poor yield by removing the bonding process 200.

Figure 3A:
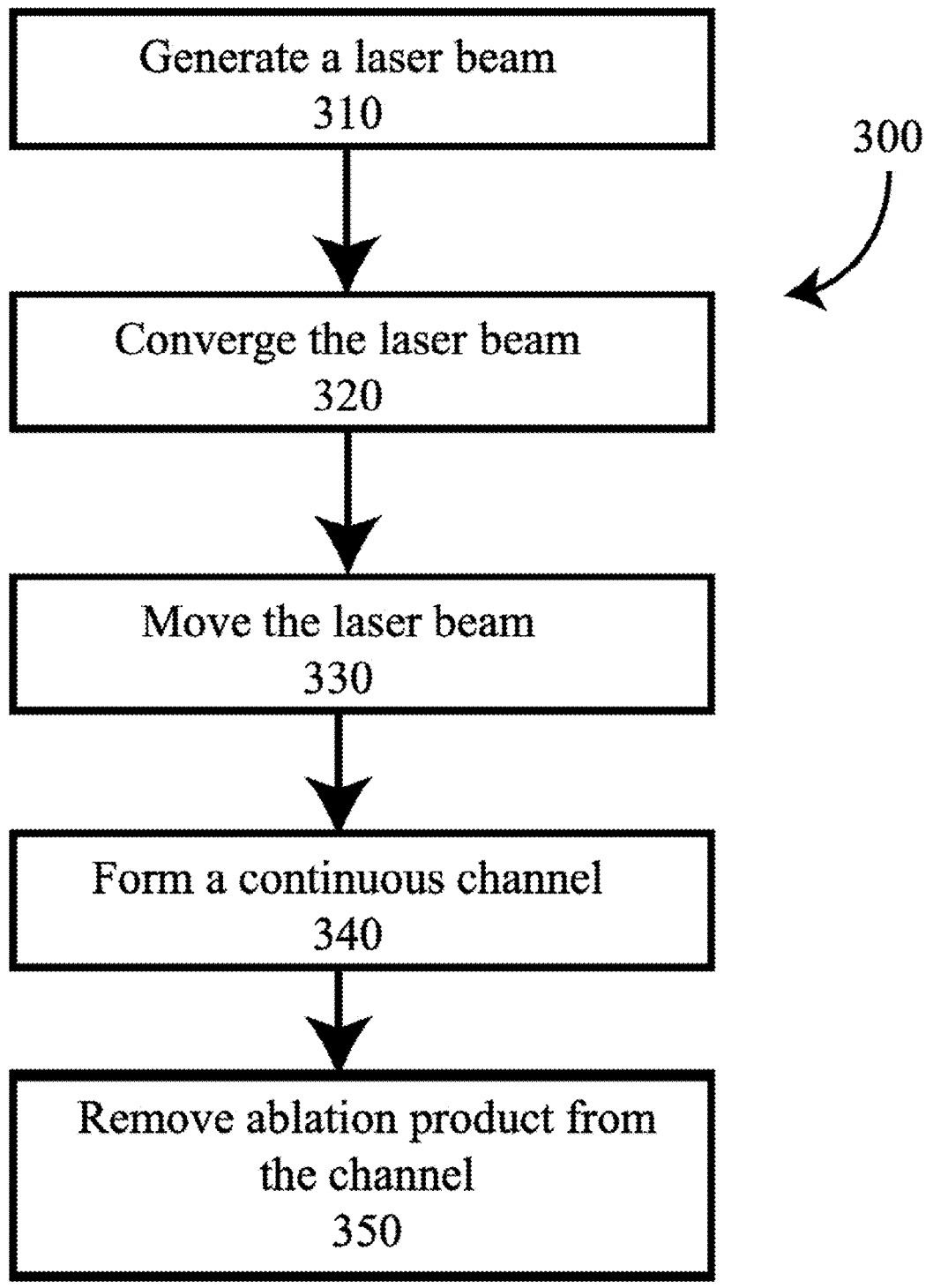
FIG. 3A shows a flow chart for a method of forming microfluidic channels in a transparent material, according to some embodiments.

Referring to FIG. 3A, a flowchart 300 illustrates an exemplary method for forming continuous channels (e.g., microfeatures and/or microchannels) in a transparent material. First, a laser source generates a laser beam 310. An exemplary laser source can be a Lumentum PicoBlade from Lumentum of San Jose, California, U.S.A., which generates a laser beam having a pulse duration of nominally 10 picoseconds (ps) and a repetition rate in a range between a single pulse up to 8 megaHertz (MHz). In some embodiments, the laser beam has a wavelength that is within a range between about 400 nm and 4000 nm. Next, the laser beam is converged 320 using a focus optic. An exemplary focus optic is a Thorlabs AL1512-C objective lens (NA=0.546, 15.00 mm diameter). In some embodiments, the laser beam is converged 320 at a relatively high rate (e.g., at a numerical aperture [NA] greater than 0.3). Typically, the laser beam is converged 320 to a focal region that is first located outside of a transparent material. An exemplary transparent material is polymethyl methacrylate, PMMA (i.e., acrylic). Then, the laser beam is moved 330 relative the transparent material generally along a scan path that brings the focal region within the transparent material. The tracing of the focal region along the scan path forms a continuous channel 340. As, the focal region is moved 330 from outside the transparent material to inside the transparent material ablation forms a vent port at an outer surface of the transparent material. According to some embodiments, the scan path is generally orthogonal to a surface of the transparent material as the focal region is moved from outside to inside the transparent material. Generally, the vent port allows for ablation product that is generated during the formation of the channel 340 to be removed to outside of the transparent material. The ablation product may initially contain a vapor which can create high pressures in an enclosed space. The pressure inside unvented channels may reach values high enough to create microcracks to form in the material. The product may also contain solid particulate or debris, which may block the channel. Finally, according to some embodiments, additional ablation product is removed from the channel 340. In some cases, the ablation product is removed by way of a solution (e.g., water) and/or an ultrasonic cleaner. In some cases, resulting ablation product within the channels is one or more of an acid or base and the solution is a pH compliment of the ablation product. For example, product in channels formed within PMMA typically contain low molecular weight organic saturated acids (e.g., formic or acetic acid) and a solution with a basic pH can be used to clean out ablation product within the channel (e.g., sodium hydroxide or sodium hypochlorite) through chemical as well as mechanical means. According to some embodiments, before removing the ablation product from the channels 240 the laser beam is again moved (e.g., scanned) relative the transparent blank along one or more additional scan paths. Generally, these additional scan paths comprise contours parallel to the original scan path and are spaced apart from one another by a predetermined distance (e.g., about 1-100 μm). Moving the focal regions along the additional scan paths can cause a modification to the continuous channel (for example, increases a width/depth of the continuous channel or modifies a surface finish of the continuous channel).

Figure 3B:
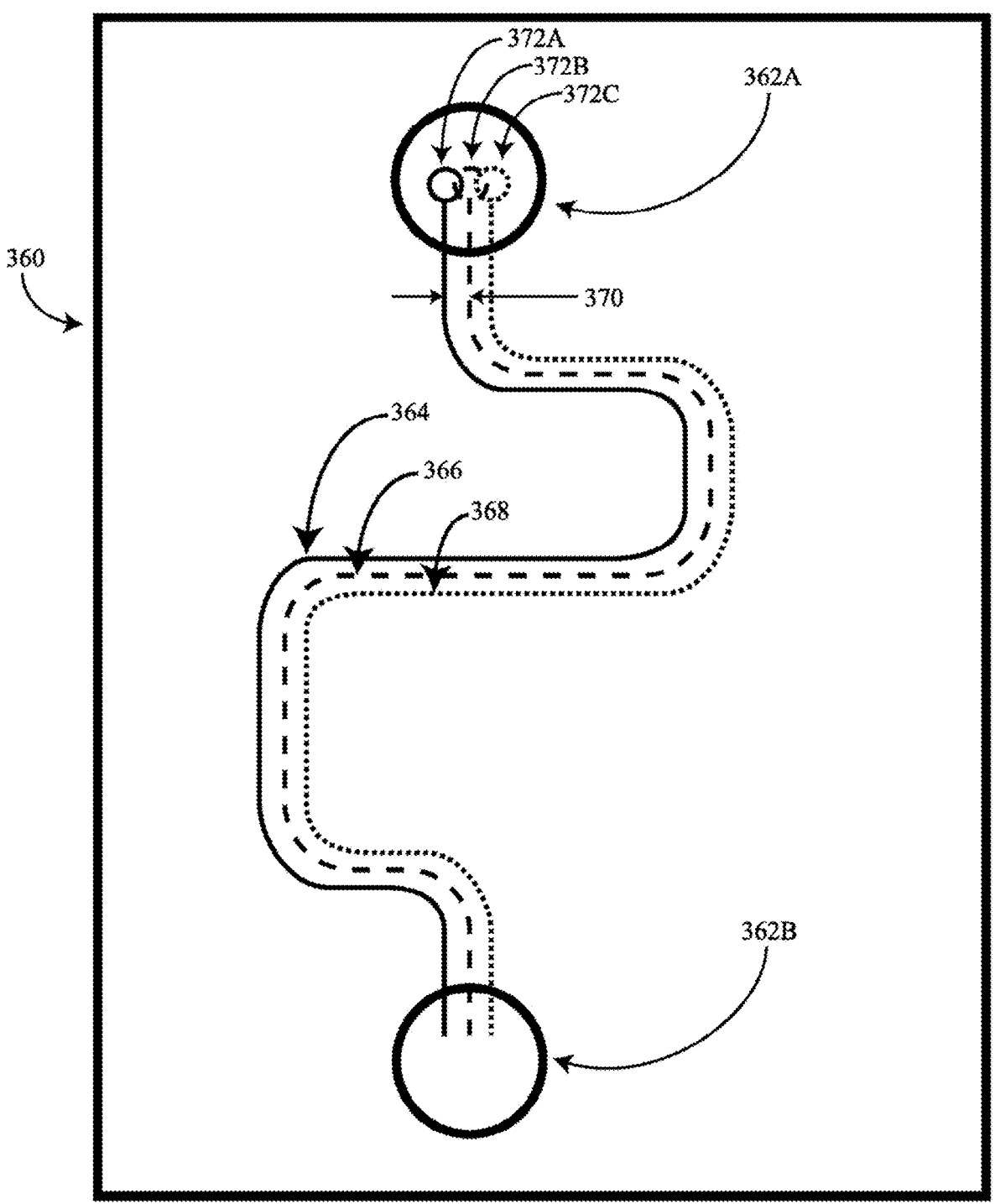
FIG. 3B illustrates formation of a continuous channel with multiple scan paths, according to some embodiments.

Referring to FIG. 3B, a top-down schematic view of a transparent material blank 360 is shown. The blank 360 has two fluidic ports 362A-B. As described in greater detail below, the fluidic ports 362A-B in some embodiments are preformed into the blank 360. Meaning, the fluidic ports 362A-B are formed before the continuous channels within the transparent material blank 360. Three scan paths are shown between the two fluidic ports, a first scan path 364, a second scan path 366, and a third scan path 368. All three of the scan paths 364, 366, and 368 follow substantially parallel paths, which are separated by a separation distance 370. A focal region 372A-C is shown at the starting position for each scan path 364, 366, and 368. It can be seen that the focal region width in FIG. 3B is slightly larger than the separation distance 370. Therefore, it is expected that a channel formed using the scan paths shown in FIG. 3B would result in one single continuous channel. Alternatively, in some embodiments, the separation distance 370 is equal to or larger than the focal region width and multiple scan paths typically result in multiple continuous channels being formed. Additionally, according to some embodiments a direction followed along the scan path is modified in order to further improve ablation product removal.

Figure 3C:
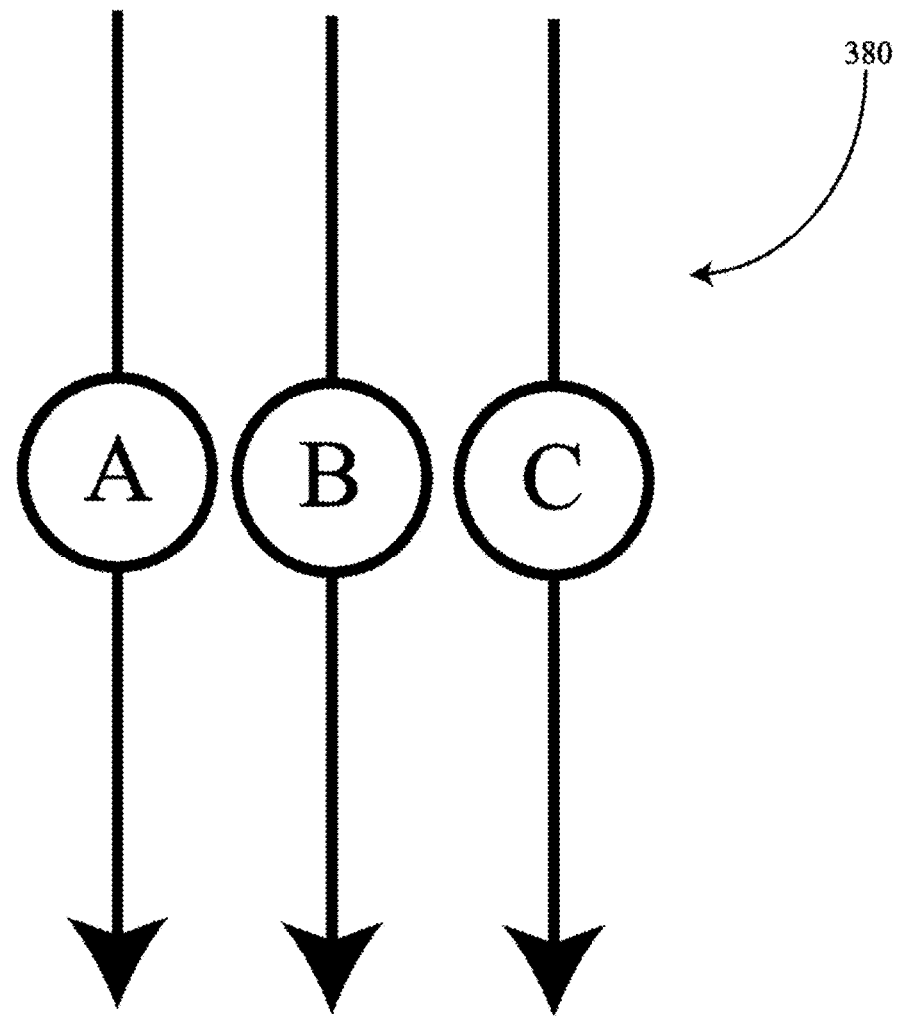
FIG. 3C schematically illustrates a unidirectional scan-ning arrangement, according to some embodiments.
Figure 3D:
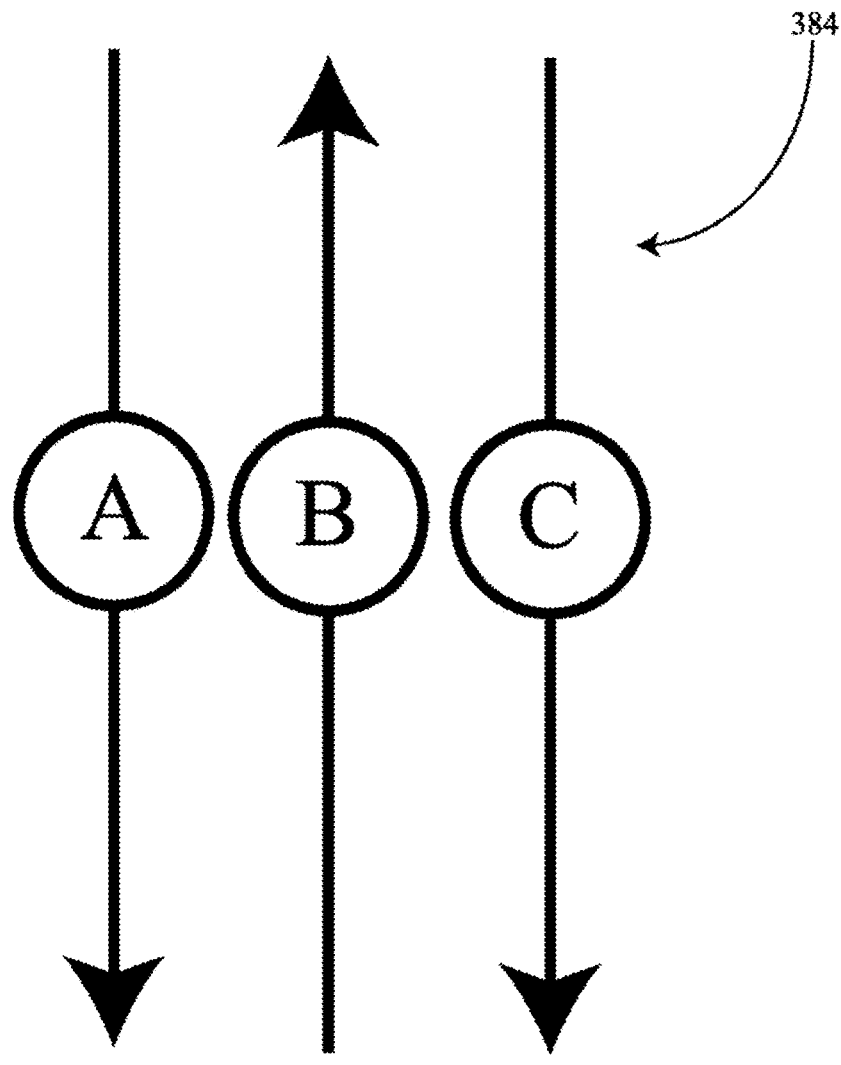
FIG. 3D schematically illustrates a first bidirectional scanning arrangement, according to some embodiments.
Figure 3E:
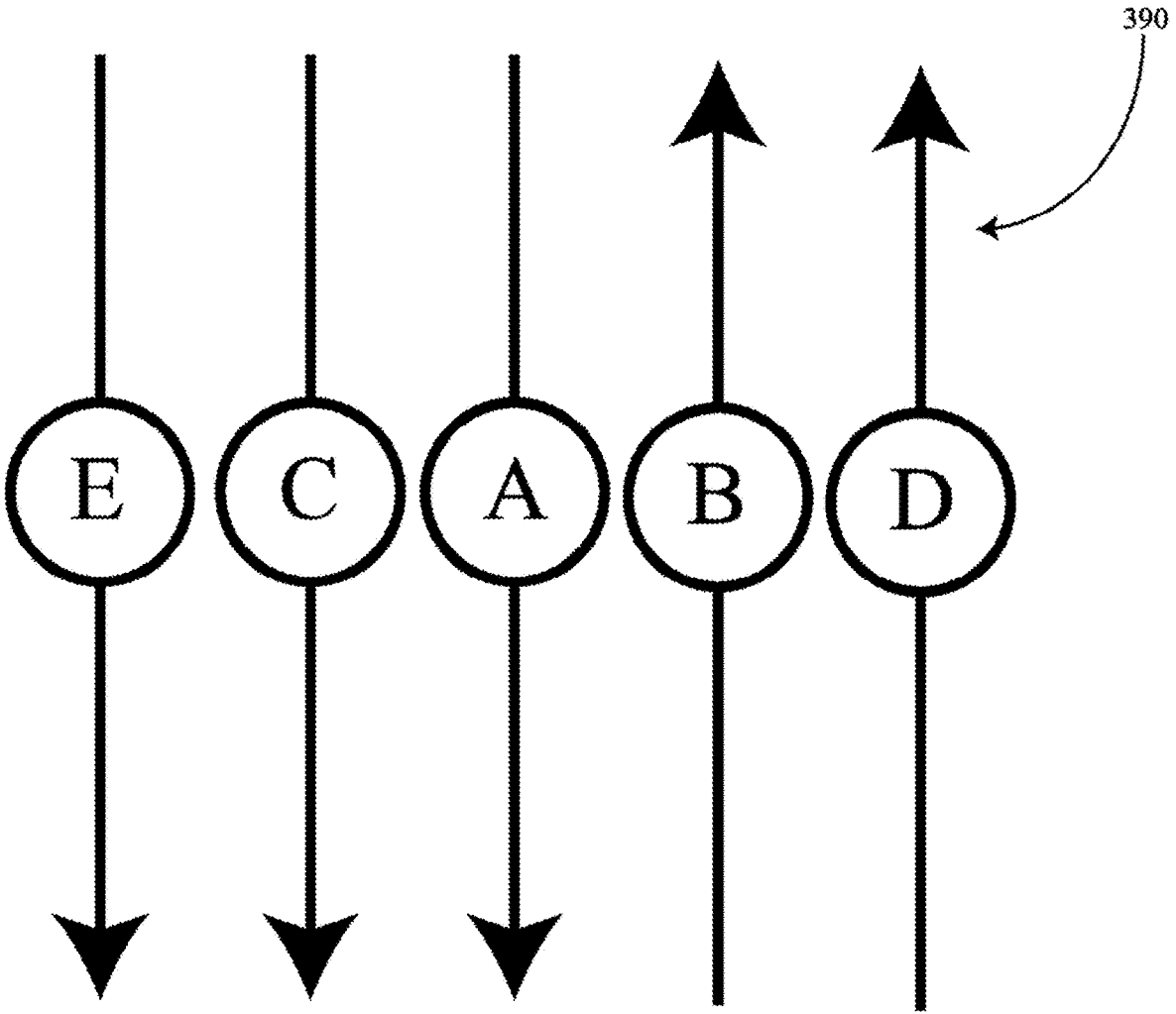
FIG. 3E schematically illustrates a second bidirectional scanning arrangement, according to some embodiments.

Referring now to FIGS. 3C-E, three different scan direction arrangements are shown. FIG. 3C displays a unidirectional scan arrangement 380 that has all of the scans going in the same direction. The unidirectional scan arrangement 380 begins with a first scan path 'A' that starts at a top of the figure and goes to a bottom of the figure. A sequence of scans continue with scan 'B' and finally scan 'C.' As all of the scans are going to same direction, FIG. 3C is said to represent a unidirectional scan arrangement 380. Bidirectional scan arrangements, where scan paths are followed in both directions, are also employed in some embodiments.

FIG. 3D illustrates a first bidirectional scan arrangement 384. The first bidirectional scan arrangement 384 begins with a first scan path 'A' that starts at a top of the figure and goes to a bottom of the figure. A sequence of scans continue with scan 'B' and finally scan 'C.' As the scans go in different directions (scan 'B' begins at the bottom of the figure and goes to the top of the figure), FIG. 3D is said to represent a type of a bidirectional scan arrangement. In some embodiments, longer continuous internal channels are able to be formed by using a bidirectional scan arrangement with vents located at each end of the channel.

FIG. 3E illustrates a second bidirectional scan arrangement 390. The second bidirectional scan arrangement 390 begins with a first scan path 'A' that starts at a top of the figure and goes to a bottom of the figure. A sequence of scans continue with scan 13', scan 'C', scan 'D', and finally scan 'E.' As the scans go in different directions (scan 'B' and scan 'D' begin at the bottom of the figure and go to the top of the figure), FIG. 3E is said to represent a type of a bidirectional scan arrangement. Unlike the unidirectional scan arrangement 380 and the first bidirectional scan arrangement 384, the second bidirectional scan arrangement 390 has the first scan (scan 'A') start in the middle and the following scans continue on each side of the first scan (scan 'A'). In some embodiments, this type of scan arrangement is advantageous as it is often the first scan in a channel formation that causes the most ablation product and is most likely to cause microcracking. When this first scan path is located at an end of a resulting channel ablation product and microcracking are more pronounced then when it is located in a middle of the channel.

Figure 4:
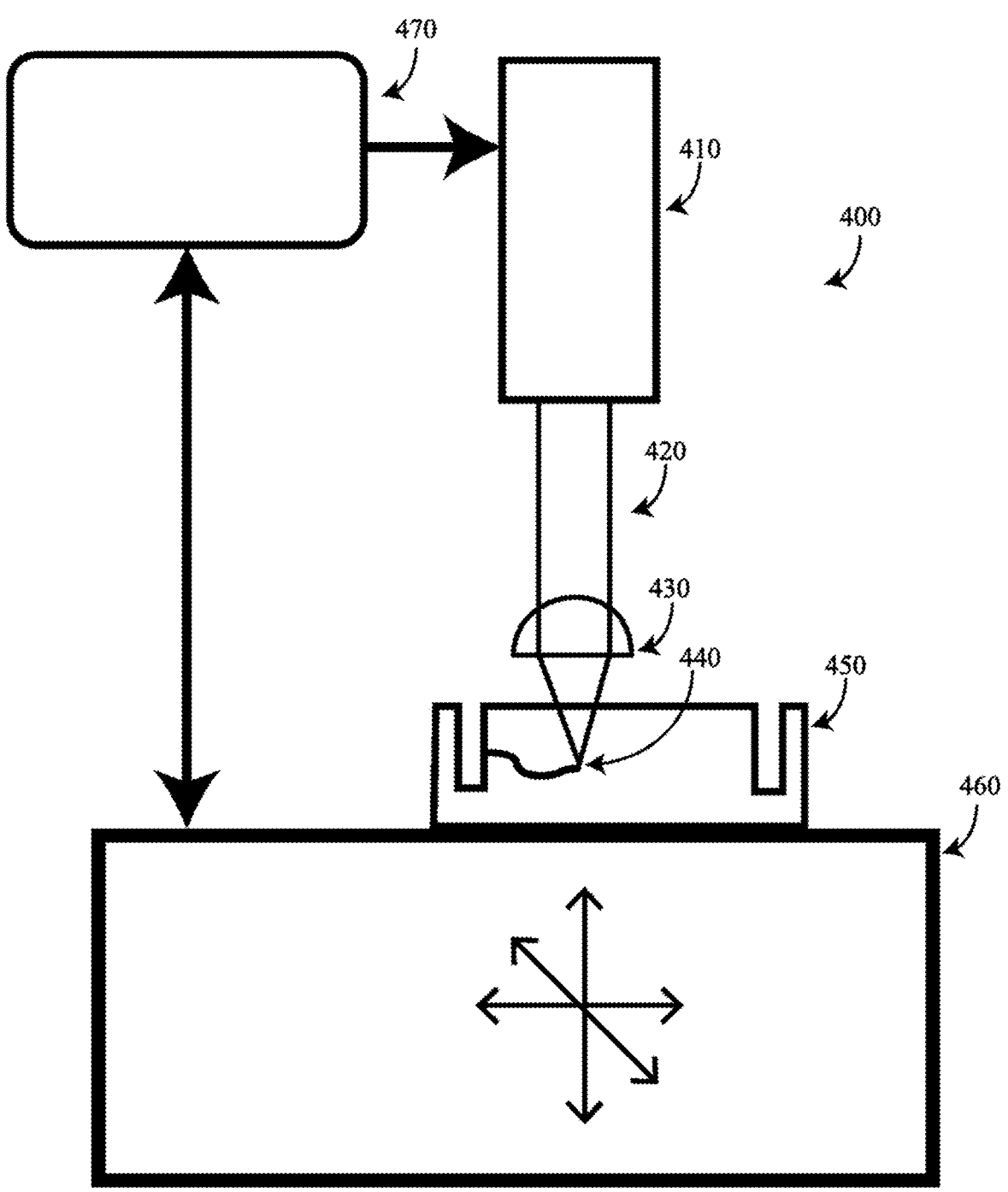
FIG. 4 schematically represents a system for forming microfluidic channels in a transparent material, according to some embodiments.

Referring now to FIG. 4, a system 400 for forming continuous channels in a transparent material is disclosed. The system 400 includes a laser source 410 (e.g., an ultra-short pulse laser having a pulse duration less than 100 nanoseconds). An exemplary laser source is a PicoBlade from Lumentum of San Jose, California, U.S.A. The laser source generates a laser beam 420 that is directed at a focus optic 430. An exemplary focus optic is a 12 mm E.F.L. aspheric lens, for example Thorlabs Part No. AL512-C (which has an outer diameter of 15 mm and a numerical aperture (NA) of 0.546). The focus optic 430 converges the laser beam and directs it to a focal region 440. In some embodiments, the focal region is first located external to a transparent material 450. One or more translation stages 460 can move the transparent material and/or the focal region relative one another. Exemplary translation stages include direct drive linear servo motor stages and piezoelectric stages. In some cases, a controller 470 can control the laser source and/or the one or more translation stages. The controller 470 in some cases controls both laser source parameters (e.g., repetition rate and pulse duration) as well as translation stage parameters (e.g., scan path, scan speed, focal region location, number of scan paths, scan path separation distance).

Figure 5A:
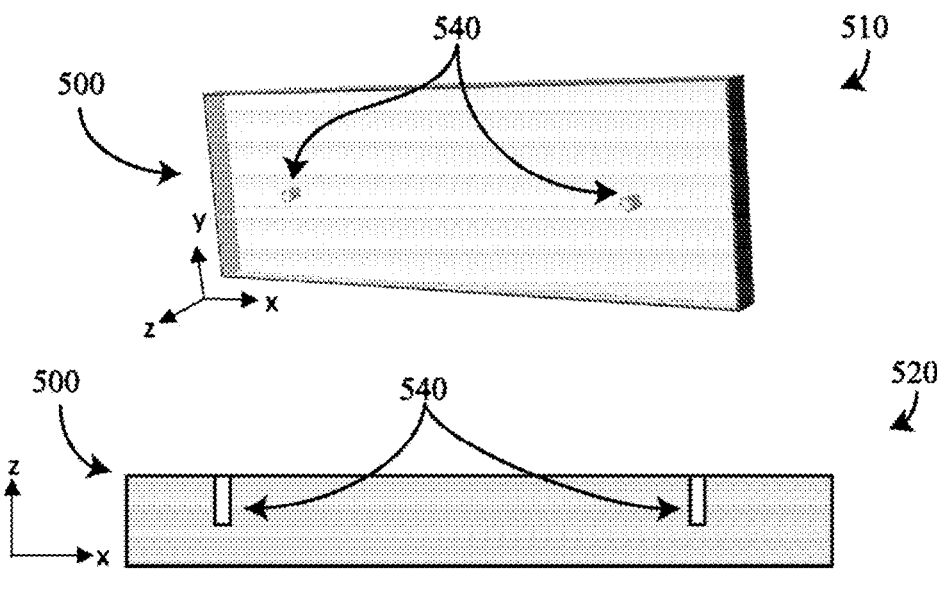
FIG. 5A schematically illustrates transparent material blanks for forming a continuous channel within, according to some embodiments.

FIG. 5A illustrates a transparent material blank 500, according to some embodiments, in two views. A first view 510 shows the blank at an angle. And, a second view 520 shows the blank at a cross-section. The blank 500, as shown in FIG. 5A, is unprocessed and contains no internal channels. The blank 500 however, does include 2 fluidic ports 540. According to some embodiments, the fluidic ports are preformed before laser processing (e.g., machined or molded into the blank 500). Alternatively, the fluidic ports 500 may be formed with a laser at the time of internal channel generation.

Figure 5B:
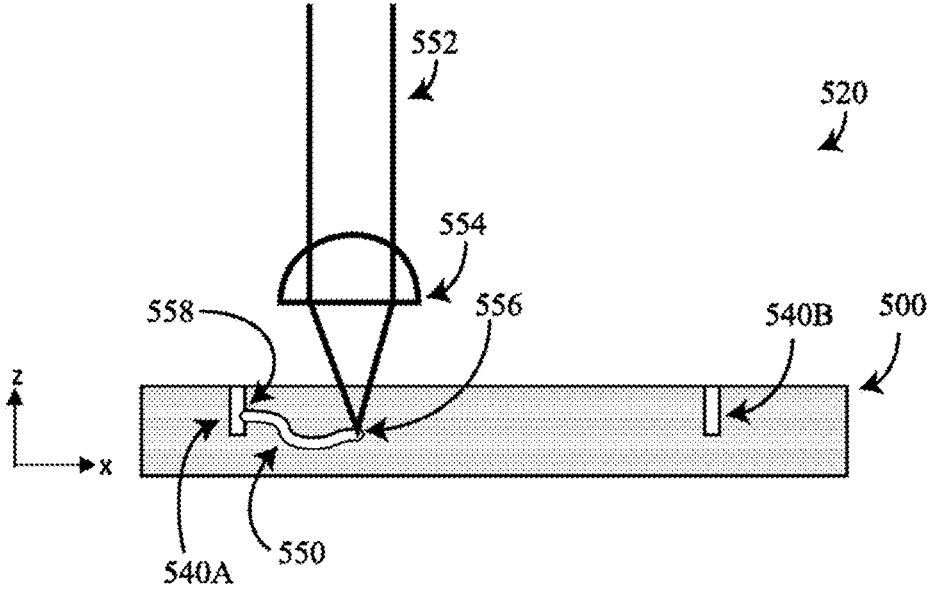
FIG. 5B schematically represents a process for forming a continuous channel in a transparent material blank having preformed ports, according to some embodiments.

FIG. 5B shows a cross-sectional view 520 of the transparent material blank 500 as it undergoes laser processing to form a continuous channel. As shown in FIG. 5B, a laser beam 552 is directed incident a focus optic 554. The focus optic 554 converges the laser beam 552 to a focal region 556 and directs the laser beam into the transparent material. One or more translation stages move the transparent blank 500 in 3 axes (e.g., X, Y, and Z) relative the focal region 556 of the laser beam. The process as shown in FIG. 5B, begins with the focal region 556 within a first fluidic port 540A. The translation stages (not shown) then moves the blank 500 relative the focal region 556, thereby producing the continuous channel 550. Because of the starting position, the continuous channel 550 has a vent 558 to outside the material. The vent 558 allows ablation product to escape during channel formation. In some cases, without the vent 558 ablation product cools and reforms within the channel, preventing the formation of a continuous channel. In some embodiments, the continuous channel is configured to coincide with a second fluidic port 540B (for example at the end of the continuous channel). Additional fluidic ports in excess of two may be used in some versions. According to some embodiments, the vent 558 is configured to be in fluidic communication with atmosphere. Alternatively, one or more vents may be configured to be in fluidic communication with a vacuum during processing.

Figure 6A:
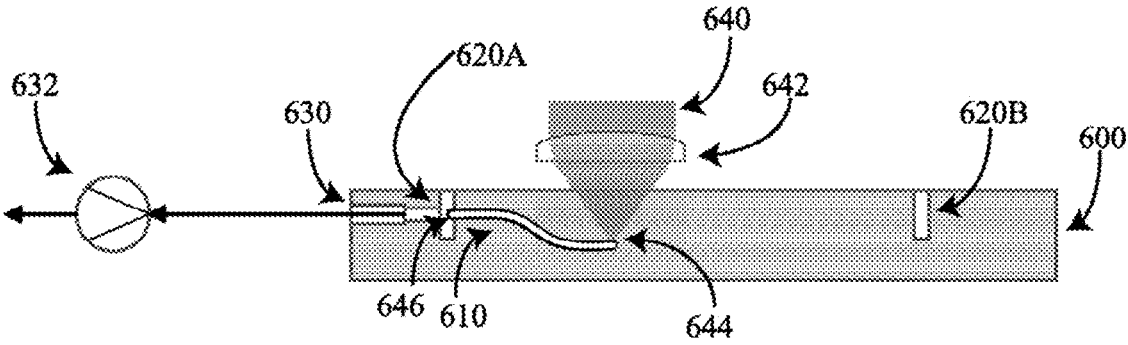
FIG. 6A schematically represents a process for forming a continuous channel in a transparent material, which includes a vacuum, according to some embodiments.
Figure 6B:
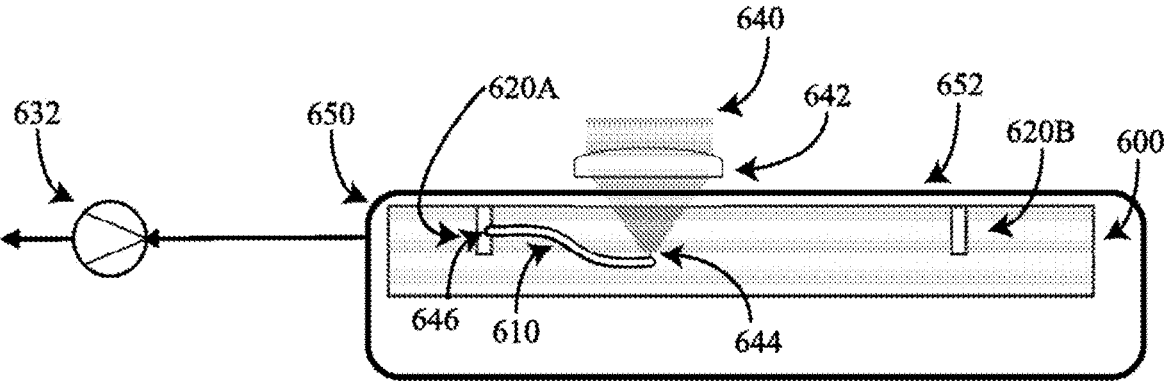
FIG. 6B schematically represents a process for forming a continuous channel in a transparent material, which includes a vacuum, according to some embodiments.

Referring now to FIGS. 6A-B, continuous channel formation systems and processes are described that include application of a vacuum. FIG. 6A illustrates a transparent material blank 600 undergoing laser processing to form a continuous channel 610. The blank 600 includes two fluidic ports 620A-B and a vacuum port 630. The vacuum port is in fluidic communication with a vacuum system 632. The vacuum system 632 includes a vacuum source (e.g., vacuum pump) that produces a vacuum (e.g., less than 760 torr down to 0 torr). A laser beam 640 is directed incident a focus optic 642, which converges the laser beam to a focal region 644. Like the process described in reference to FIG. 5B, the focal region 644 initially starts at a first fluidic port 620A, and one or more translation stages (not shown) move the focal region 644 relative the blank 600 generally along a scan path to form the continuous channel 610. As a result, a vent 646 is formed between the first fluidic port 620A and the continuous channel 610. The vent 646 allows ablation product that is formed during channel formation to escape the channel. The vacuum system 632 is in fluidic communication with the vent 646, by way of the vacuum port 630 and the first fluidic port 620A. The vacuum system therefore introduces a vacuum to the vent 646 and further increases a pressure gradient between an ablation pressure (locally formed within the channel during ablation) and a much lower vent pressure (e.g., less than atmosphere).

FIG. 6B illustrates another embodiment, in which the entire blank 600 is placed within a vacuum chamber 650, which is in fluidic communication with the vacuum system 632. In the embodiment shown in FIG. 6B, a surface 652 of the vacuum chamber is interposed between the focus optic 642 and the blank 600. In this case, the surface comprises a material that is vacuum compatible and transparent at a wavelength of the laser beam. Exemplary materials include optical materials, such as: glass, quartz, sapphire, and industrial diamond. Some implementations can provide a new capability for forming internal channels in three-dimensions (3D), for example microfluidic devices.

Figure 6C:
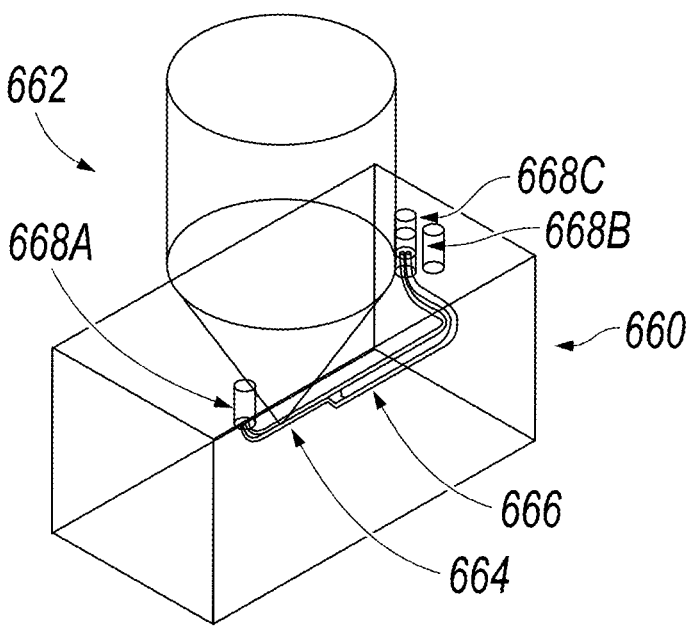
FIG. 6C schematically represents an isometric view of a process for forming a continuous channel in a transparent material, according to some embodiments.
Figure 6D:
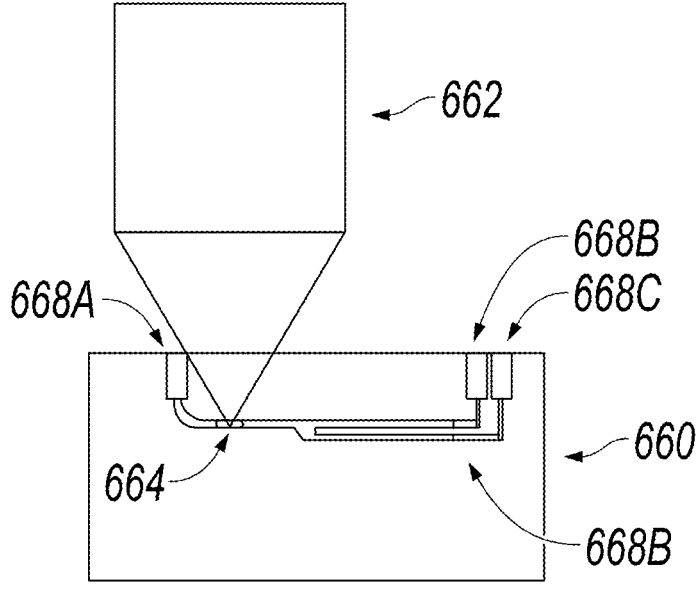
FIG. 6D schematically represents a front view of a process for forming a continuous channel in a transparent material, according to some embodiments.

FIGS. 6C-D schematically represents formation of a 3D channel in a transparent blank 660. A laser beam 662 is focused by a focus optic (not shown) and converged to a focal region 664. The focal region 664 is shown within microfluidic features 666. The microfluidic features 666 can be seen to be three dimensional (3D) (see FIG. 6D). The microfluidic features 666 show in FIGS. 6C-D can be designed to separate different components within a fluid (e.g., cells within blood). The microfluidic features 666 provide fluidic communication between three fluidic ports 668A-C. In order to produce functional microfluidic features 666, it is possible to adjust process parameters to achieve desired microfluidic feature characteristics.

Parameter Selection

A number of parameters can be adjusted to control various characteristics of the channels. Considerations related to parameter selection are enumerated below.

Pulse duration of a pulsed laser beam has an important effect on the channel quality. Generally, shorter pulse durations result in less bulk heating of the non-ablated transparent material and fewer thermal effects result. For example, pulse durations of about 100 nanoseconds (ns) have been found to produce carbonization in internal channels formed within PMMA, according to some embodiments.

Pulse repetition rate of a pulsed laser beam along with scan speed can affect a pitch between adjacent laser pulses along a scan path. Therefore, pulse repetition rate can affect surface finish of a resulting channel. Pulse repetition rate is also controlled in some embodiments to manage overall (e.g., average) radiative power delivered to the transparent material. Although, the transparent material is largely non-absorbing to the laser beam, some small amount (e.g., less than 1%) of the delivered energy can be absorbed optically. Additionally, in some cases much of the energy (e.g., greater than 10%) of the delivered energy is retained within the transparent material after ablation product cools. Therefore, it can be desirable in some embodiments to control the overall amount of radiative power delivered to the transparent material.

Wavelength can be selected in part based upon laser sources, which are commercially available. Ultrashort pulse duration lasers are currently limited to a number of wavelengths. Additionally, in some embodiments, wavelength is selected in order to achieve a desired absorption (e.g., linear, multi-photon, non-linear, etc.) of the transparent material.

Numerical aperture (NA) and focal region width are optical parameters that are related. The focal region width in some embodiments, is selected based upon a desired minimum feature size (e.g., desired minimum channel width). Alternatively, in some embodiments, focal region width is selected in order to achieve a desired minimum fluence/irradiance value, to produce desired ablation characteristics.

Scan path separation distance, or a distance between adjacent scans that together comprise a single channel, can affect surface finish of a resulting channel. For example, in general, a larger separation distance between adjacent scan paths can result in a rougher surface finish within the resulting continuous channel. Also, in some embodiments, separation distance between adjacent scan paths can be selected to control resulting channel height. For example, a smaller separation distance between adjacent scan paths can result in greater accumulated energy with the channel and causes an elongation of the height of the channel.

A number of scans per channel parameter can be related to the separation distance between adjacent scan paths. In many embodiments, the number of scans per channel parameter is controlled in order to produce a desired channel width, given a set separation distance between adjacent scans.

Scan speed is another parameter that can affect surface roughness and height of the resulting channel. For example, slower scan speeds (all else being equal) can result in smoother and higher channel formation. Additionally, scan speed affects accumulation of radiative energy within local areas in the transparent material. For example, faster moving scan speeds (all else being equal) can allow less total energy to be directed to any given location of the transparent material proximal the scan path.

A length of channel parameter is a total path length of the channel to nearest vent. This parameter is controlled to be kept below a desired threshold in order to ensure that ablation product is able to escape through the vent and the channels are kept continuous. For example, a length of channel that is too long prevents the ablation product from escaping the channel and the ablation product forms a blockage within the channel preventing fluidic flow within the channel.

Considerations related to parameter selection are described above. In order to further aid in parameter selection a table containing exemplary parameter ranges is disclosed below:

| Parameter | Min. | Nom. | Max. |
|---|---|---|---|
| Pulse duration | 1 fs | 100 fs | 1000 ns |
| Pulse repetition rate | 1 Hz | 4 kHz | 100 kHz |
| Wavelength | 400 nm | 1064 nm | 4000 nm |
| Numerical aperture (NA) | 0.01 | 0.5 | 1.0 |
| Focal region width | 0.01 μm | 2 μm | 500 μm |
| Scan path separation distance | 0.01 μm | 2 μm | 500 μm |
| Scan speed | 0.01 mm/s | 2 mm/s | 5000 mm/s |
| No. of scans per channel | 1 | 10 | 10,000,000 |
| Length of channel | 0.1 mm | 50 mm | 10 m |
| Width of channel | 1 μm | 100 μm | 10000 μm |
| Depth of channel | 10 μm | 15 μm | 350 μm |
| Vacuum Pressure | 0 torr | 1 torr | 760 torr |
| Transparent material | General Purpose Polystyrene (GPPS), Methylmethacrylate Acrylonitrile Butadiene Styrene (MABS), Styrene acrylonitrile (SAN), Styrene Methyl Methacrylate (SMMA), Methacrylate Butadiene Styrene (MBS), Styrene-butadiene (SB) Copolymer, Polycarbonate (PC), High Heat Polycarbonate (HH PC), Polyethylene Terephthalate (PET), Glycol-Modified Polyethylene Terephthalate (PET-G), Poly(Methyl Methacrylate) (PMMA), Polyethyleneimine (PEI), Polyethersulfone (PES), Polysulfone (PSU), Polypropylene Homopolymer (PP H), Random Copolymerized Polypropylene (PP R), Low-Density Polyethylene (LDPE), Polylactic Acid (PLA), glass, Styrene-Ethylene/Butylene-Styrene (SEBS), Thermoplastic Polyurethane (TPU), and Thermoplastic Olefin (TPO), crystal, sapphire, and quartz | | |

Example Embodiments

Figure 7:
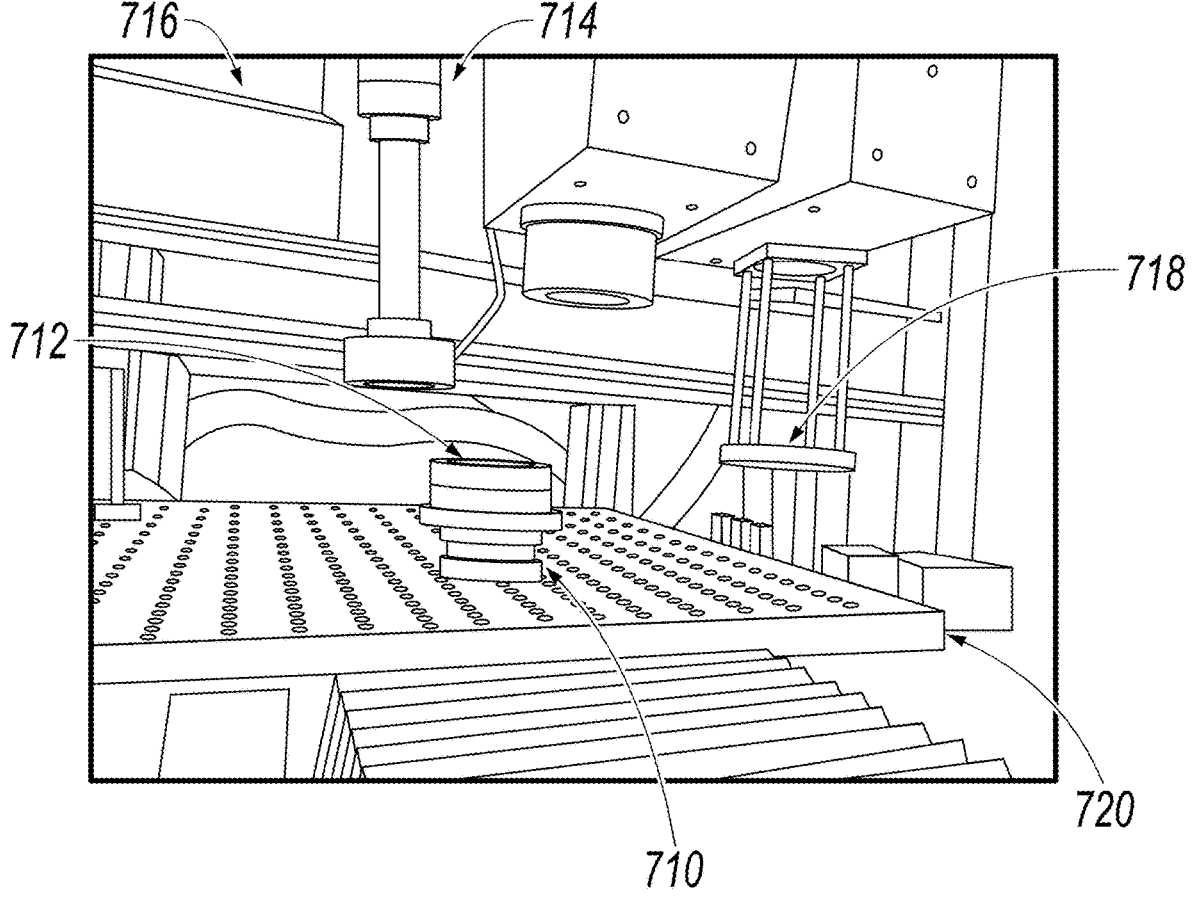
FIG. 7 is an image showing a system for forming con-tinuous channels in a transparent material, according to some embodiments.

A number of trials were performed to demonstrate channel formation within a transparent material. The details of these trials are described in detail below. FIG. 7 is an image showing an embodiment of a system used to form continuous channels within a transparent material. A sample holder 710 can provide a secure mount for a transparent material blank 712. An inspection camera 714 was directed downward and used to aid in alignment of the blank 712. A laser source 716 was used to generate a laser beam. The laser source used was a Lumentum PicoBlade operating with a 1064 nm wavelength and a pulse duration of 10 pS nominal. The laser beam was directed through a focus optic 718. The focus optic used was a 12 mm E.F.L. aspheric lens (Thorlabs Part No. AL1512-C). The aspheric lens had a numerical aperture (NA) of 0.546 and an outside diameter of 15 mm nominal. A stage assembly 720 was used to move the sample holder 710 relative the focus optic 718 and thereby produce a relative motion between a focal region of the laser beam and the transparent blank 712.

Figure 8:
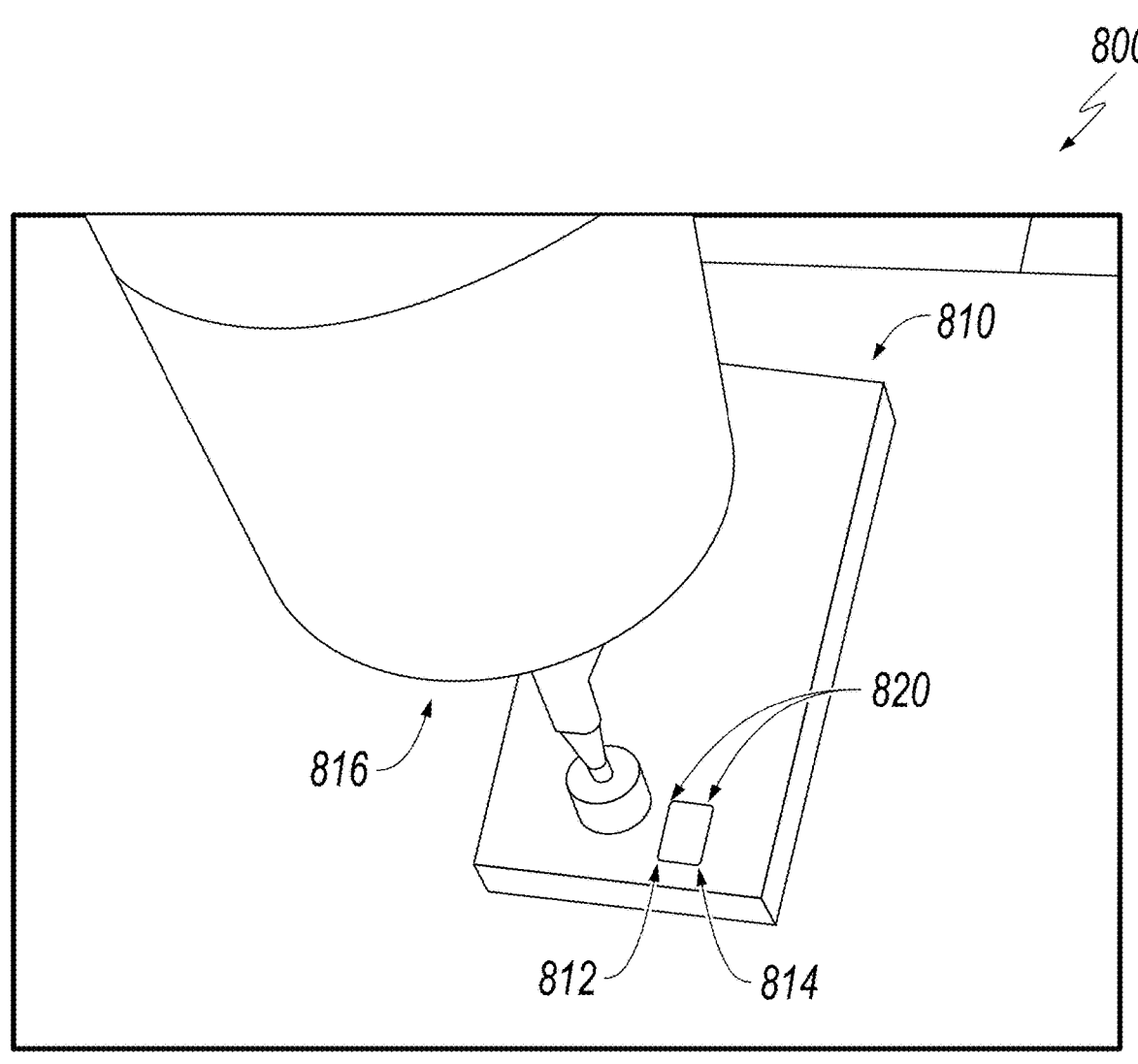
FIG. 8 is an image that shows air passing through a continuous channel formed within a transparent material, according to some embodiments.

A number of transparent material blanks 712 were produced out of clear PMMA. The blanks all had one or more preformed fluidic ports. The channels were formed by first starting each scan path within a fluidic port and ending the scan path within another fluidic port. After channel formation, testing was performed to show that the formed channels were continuous and substantially free from blockage. FIG. 8 illustrates an exemplary channel test 800 to test for blockage within the channel. A blank 810 is shown having an internal continuous channel 812 between a first fluidic port (not shown) and a second fluidic port 814. A syringe 816 containing air is sealed in fluidic communication with the first fluidic port and dye containing deionized (DI) water is placed within the second fluidic port 814. As, the syringe 816 is compressed, bubbles 820 form within the dye containing DI water within the second fluidic port 814, indicating fluidic communication throughout the channel 812.

Figure 9A:
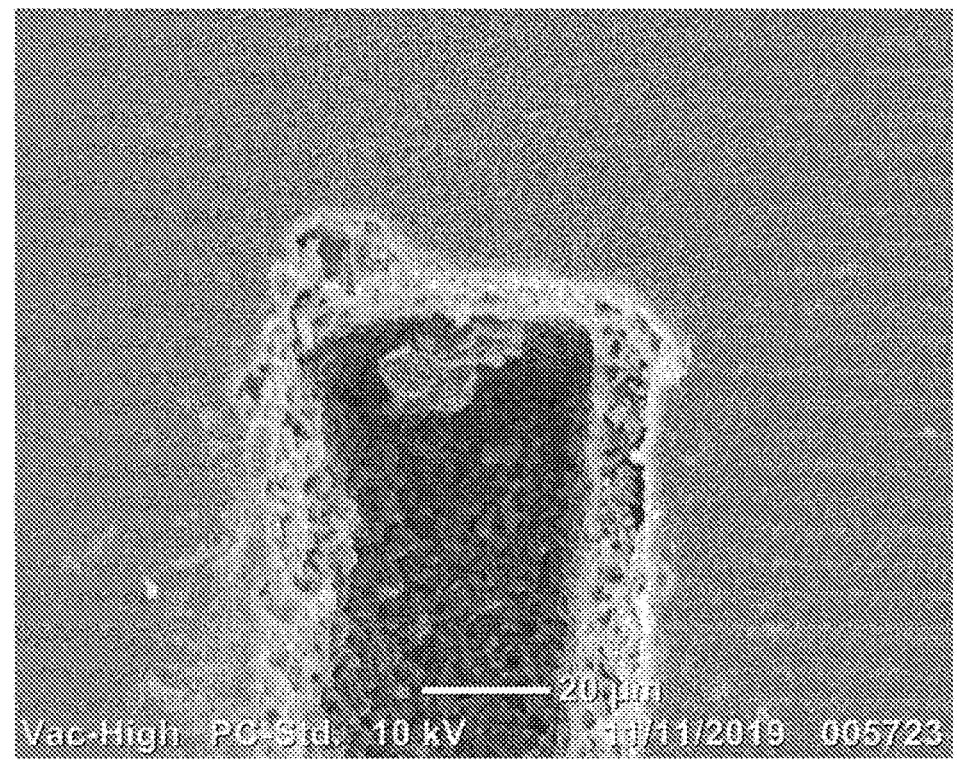
FIG. 9A is a scanning electron microscope (SEM) of a surface of a modified transparent material with a scan path separation distance of two micrometers, according to some embodiments.
Figure 9B:
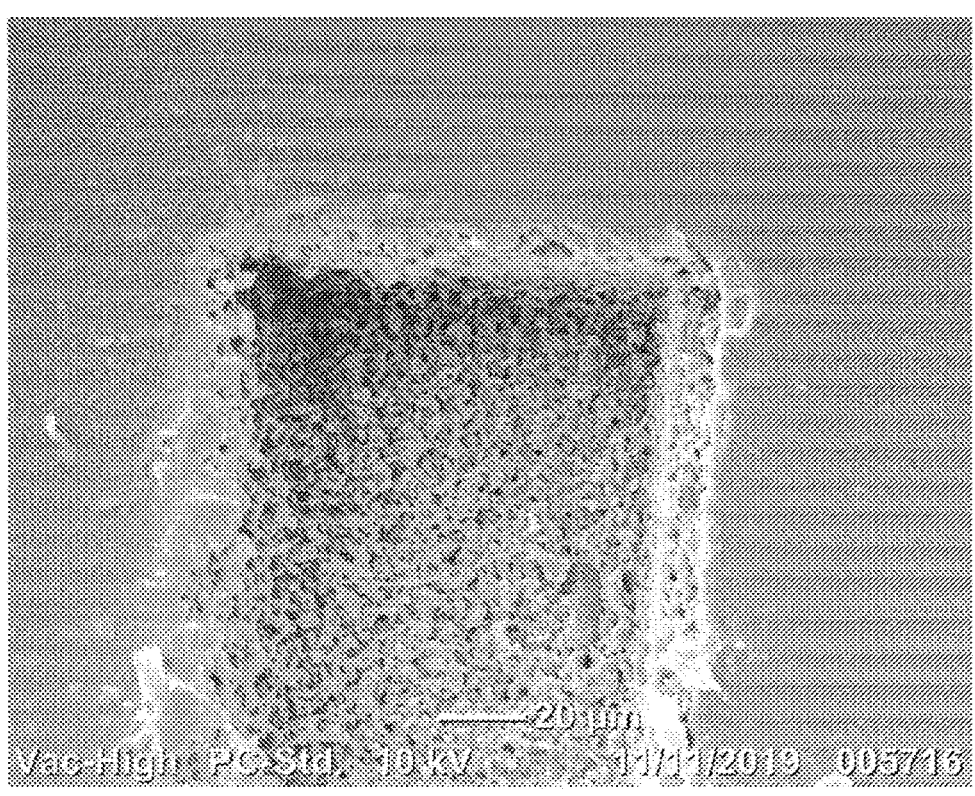
FIG. 9B is a scanning electron microscope (SEM) of a surface of a modified transparent material with a scan path separation distance of five micrometers, according to some embodiments.
Figure 9C:
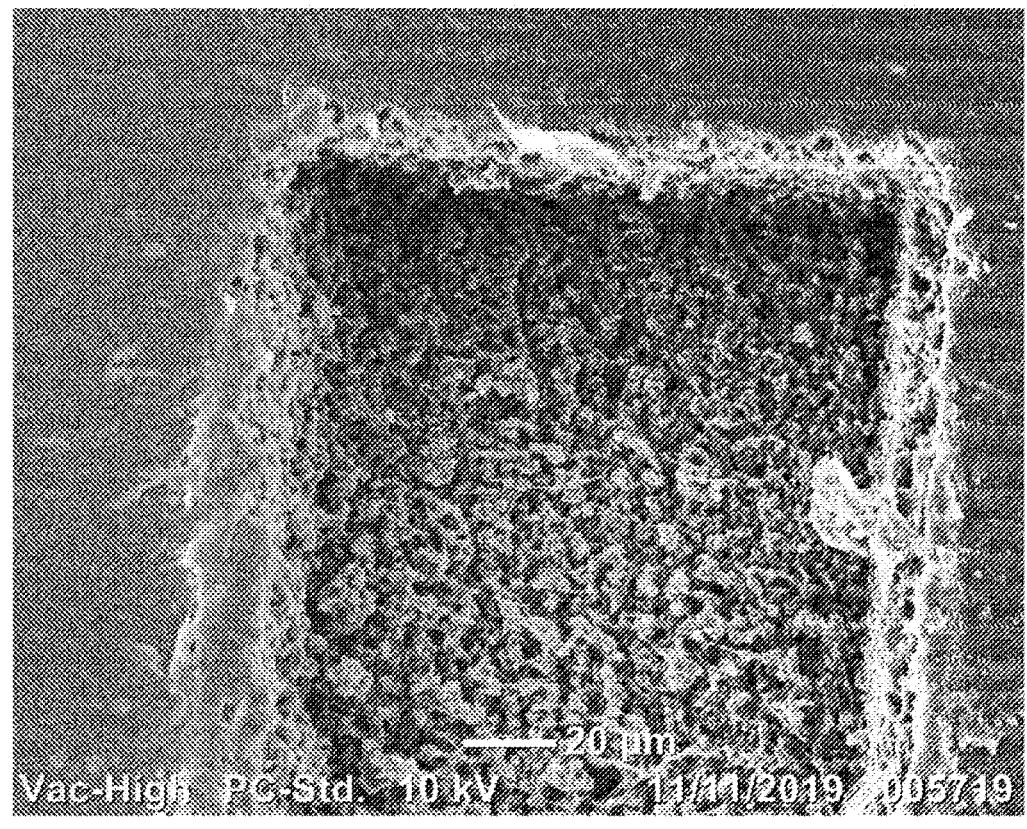
FIG. 9C is a scanning electron microscope (SEM) of a surface of a modified transparent material with a scan path separation distance of seven micrometers, according to some embodiments.
Figure 9D:
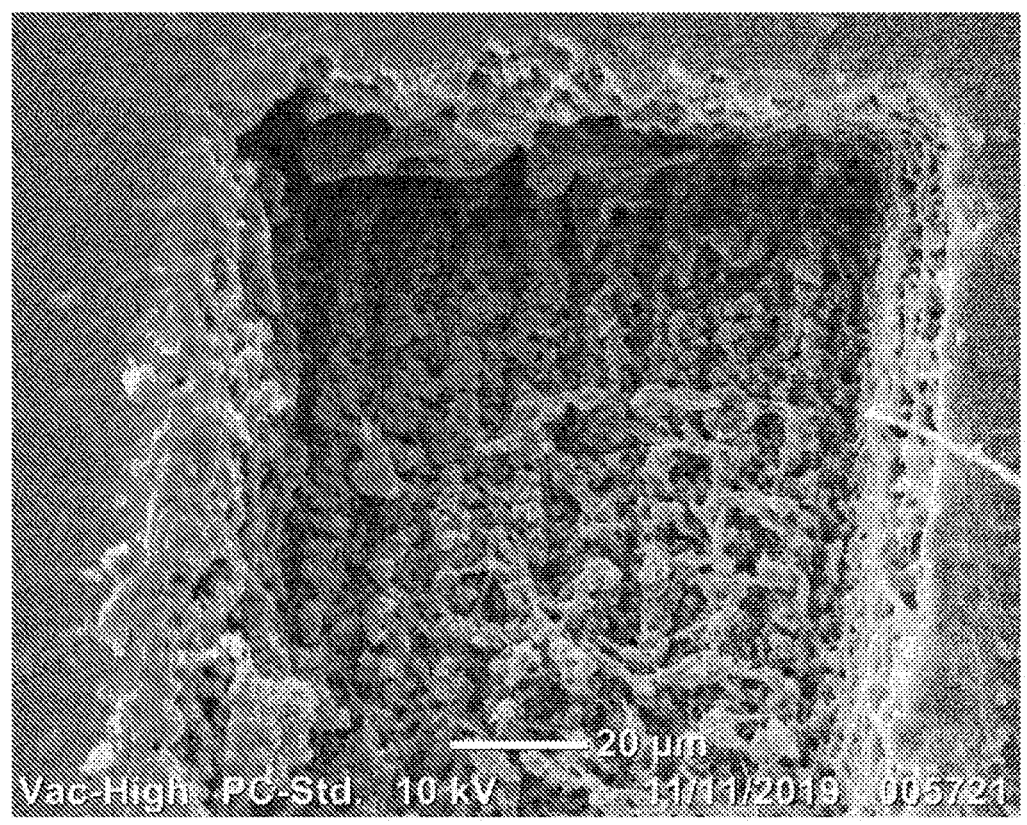
FIG. 9D is a scanning electron microscope (SEM) of a surface of a modified transparent material with a scan path separation distance of ten micrometers, according to some embodiments.

In order to demonstrate channel surface characteristics (e.g., surface roughness and channel height), a number of surface channels were formed on a surface (not inside) of a clear PMMA blank. In order to form the surface channels, the focal region was placed coincident with a top surface of the blank. The following process parameters were used in forming all of the surface channels: 1064 nm wavelength, 10 ps, 4 kHz pulse repetition rate, and 2 mm/s scanning rate. A separation distance parameter was varied. FIGS. 9A-D are scanning electron microscope (SEM) images of surface channels with differing separation distances between adjacent scan paths. FIG. 9A illustrates a surface channel forming with a separation distance parameter of 2 micrometers. FIG. 9B illustrates a surface channel forming with a separation distance parameter of 5 micrometers. FIG. 9C illustrates a surface channel forming with a separation distance parameter of 7 micrometers. FIG. 9D illustrates a surface channel forming with a separation distance parameter of 10 micrometers. It can be seen from FIGS. 9A-D that as spacing between adjacent scan paths increases, height and roughness of the resulting channel also increase.

Figure 10:
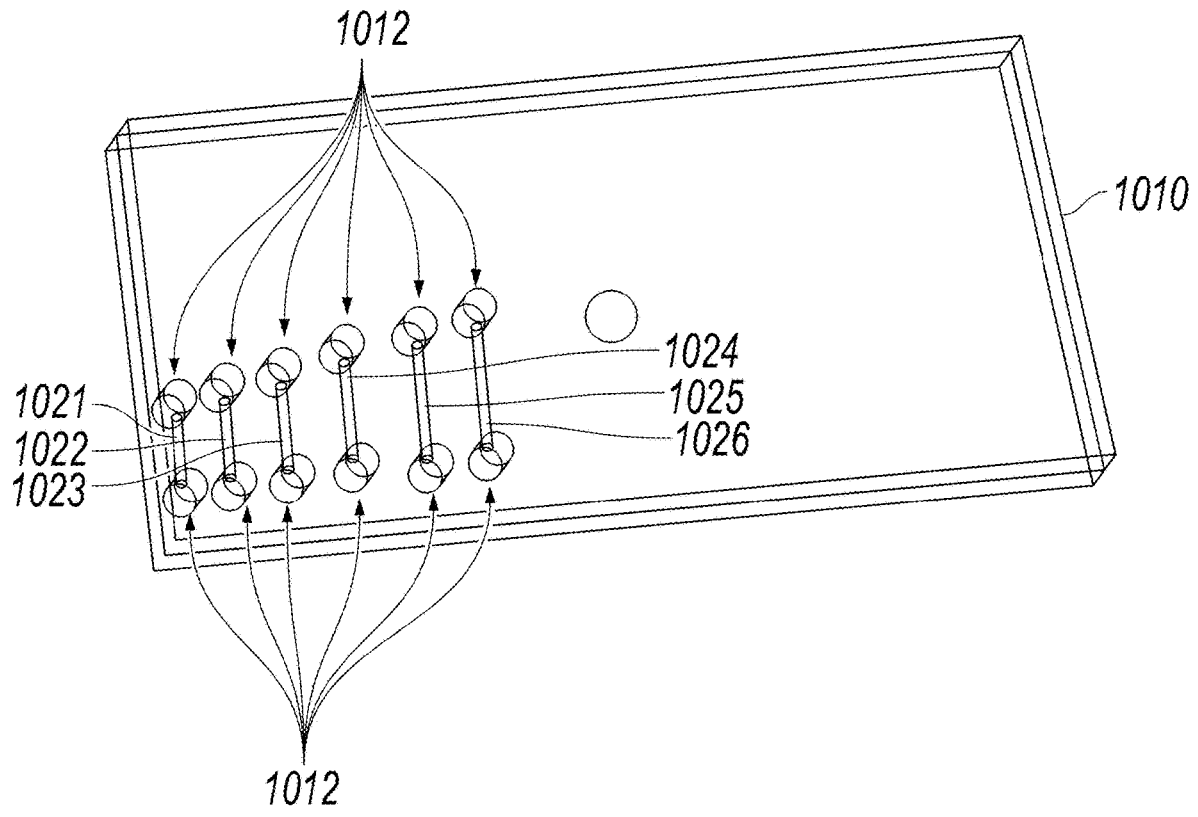
FIG. 10 is an image showing channels with differing lengths formed in a transparent material, according to some embodiments.

Referring to FIG. 10, in order to demonstrate channels with different lengths (e.g., scan path lengths), a number of internal channels were formed inside of a clear PMMA blank 1010. The blank 1010 had 12 (6 pairs) preformed fluidic ports 1012. A distance between pairs of the fluidic ports varied from 5 mm to 10 mm in increments of 1 mm, with channel 1 1021 being 5 mm long; channel 2 1022 being 6 mm long; channel 3 1023 being 7 mm long; channel 4 1024 being 8 mm long; channel 5 1025 being 9 mm long; and, channel 6 1026 being 10 mm long. All, 6 channels were formed using identical process parameters including: 40 total bidirectional scans with a lateral separation distance of 10 micrometers (channel width of 200 micrometers nominal) and a vertical separation distance of 50 micrometers (first focal region depth at 500 micrometers and second focal region depth at 450 micrometers). The following process parameters were used in forming all of the internal channels: 1064 nm wavelength, 10 ps, 4 kHz pulse repetition rate, and 2 mm/sec scanning rate. Finally, the blank 1010 was placed in an ultrasonic bath for 300 seconds. All channels 1021-1026 were tested by the method described above and found to be continuous and free from blockage.

Figure 11:
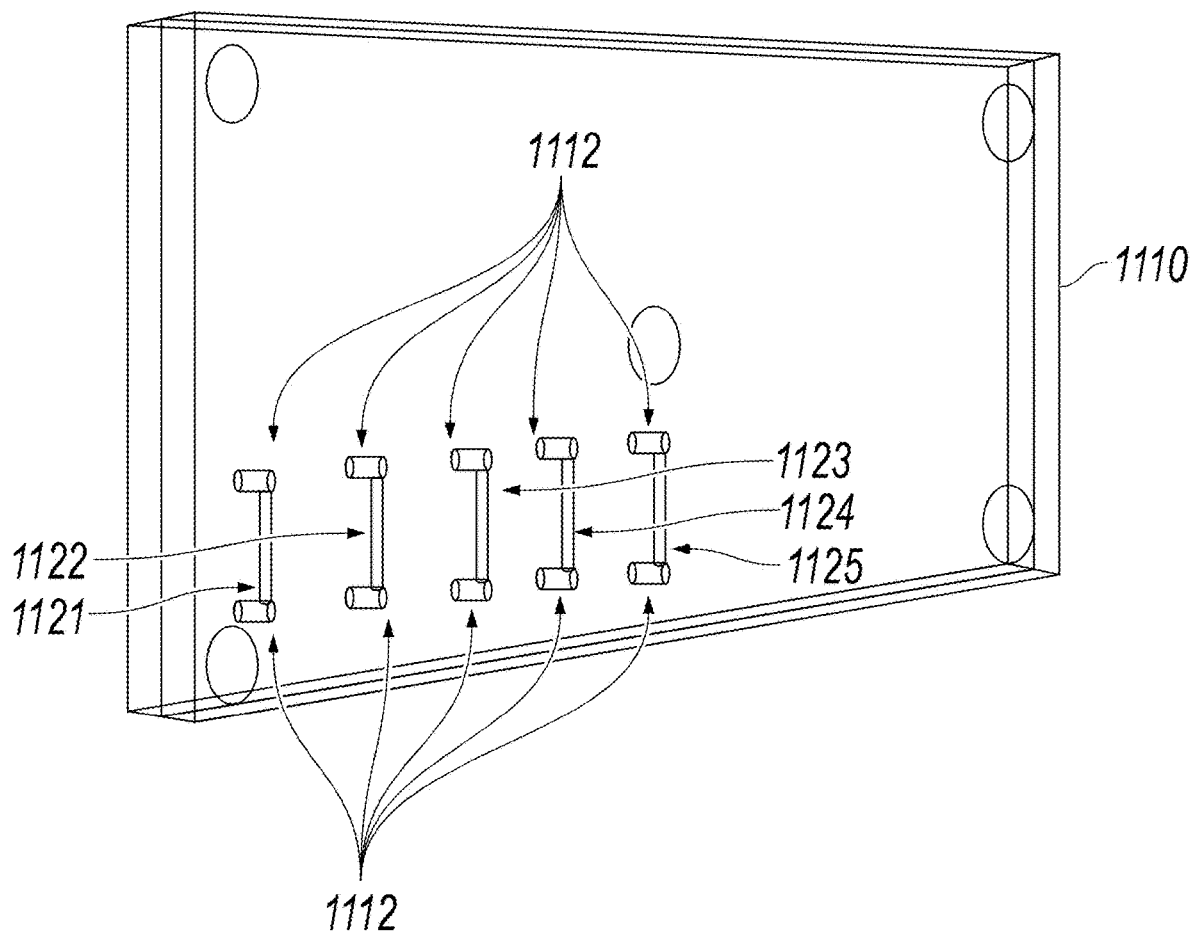
FIG. 11 is an image showing channels at different depths formed in a transparent material, according to some embodiments; and, FIG. 12 is an image showing a functional microfluidic device in a transparent material, manufactured according to some embodiments.

Referring now to FIG. 11, to demonstrate multiple channels at different depths, a number of internal channels were formed inside of a clear PMMA blank 1110. The blank had 10 (5 pairs of) preformed fluidic ports 1112. A distance between pairs of fluidic ports was 5 mm for all fluidic port pairs. Laser parameters included: 1064 nm wavelength, 10 ps, 4 kHz pulse repetition rate, and 2 mm/sec scanning rate. Parameters for the 5 pairs of fluidic ports are included in the table below:

| Channel ID | FIG. Numeral | Scan Path Separation Distance (μm) | Channel Width (μm) | Focal Region Depth | Total Number of Scan Passes |
|---|---|---|---|---|---|
| 1 | 1121 | 5 | 200 | 500, 450 | 80 |
| 2 | 1122 | 10 | 400 | 500, 450 | 80 |
| 3 | 1123 | 20 | 800 | 500, 450 | 80 |
| 4 | 1124 | 5 | 100 | 500, 450, 1000, 950 | 80 |
| 5 | 1125 | 10 | 100 | 500, 450, 1000, 950 | 40 |

It can be seen in FIG. 11, that channel 4 1124 and channel 5 1125 include two channels at two different depths, demonstrating an ability of some embodiments of the invention to produce channels in three dimensions. All of the channels 1121-1125 (channels 1-5) were tested before ultrasonic cleaning and found to be obstructed. After the blank 1110 was placed in an ultrasonic bath for 300 seconds, all of the channels 1121-1125 (channel 1-5) were retested and found to continuous and free from blockage. Said another way, all of the channels were cleared of ablation product during ultrasonic cleaning.

Figure 12:
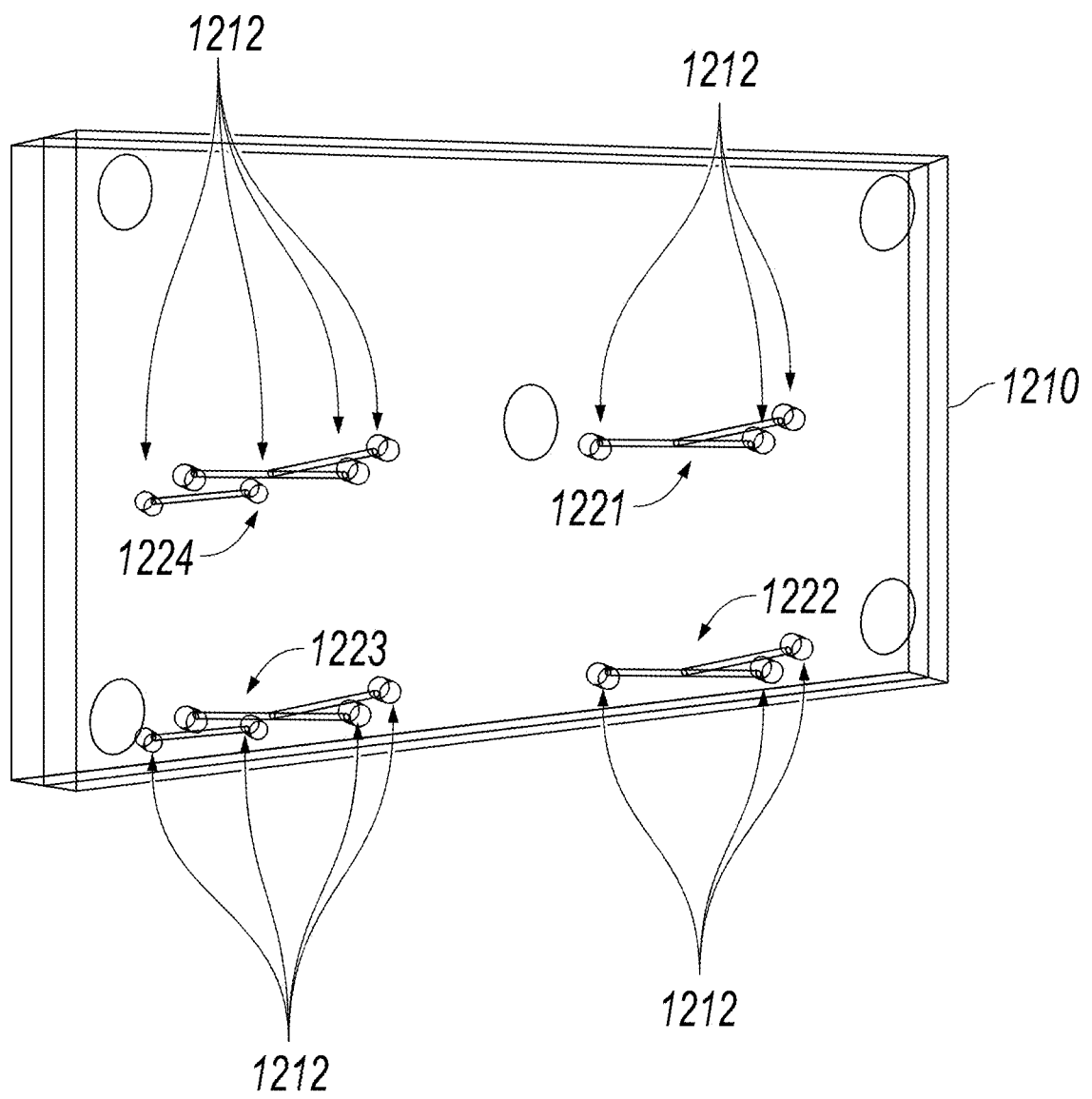

Referring now to FIG. 12, to demonstrate generation of functional microfluidic devices, a number of channels were formed inside of a clear PMMA blank 1210. The blank 1210 had four sets of three or four preformed fluidic ports 1212. Between the four sets of preformed holes, four structures were formed capable of simple cell sorting. A first structure 1221 and a second structure 1222 both had a spacing between fluidic ports 1212 of 10 mm nominally. A third structure 1223 and a fourth structure 1224 both had a spacing between fluidics ports 1212 of 5 mm nominally. Laser parameters included: 1064 nm wavelength, 10 ps, 4 kHz pulse repetition rate, and 2 mm/sec scanning rate. Parameters for the 5 pairs of fluidic ports are included in the table below:

| Structure ID | FIG Numeral | Scan Path Separation Distance (μm) | Channel Width (μm) | Focal Region Depth | Total Number of Scan Passes |
|---|---|---|---|---|---|
| 1 | 1221 | 10 | 100 | 500, 475, 450 | 30 |
| 2 | 1222 | 10 | 100 | 500, 475, 450 | 30 |

-continued

| Structure ID | FIG Numeral | Scan Path Separation Distance (μm) | Channel Width (μm) | Focal Region Depth | Total Number of Scan Passes |
|---|---|---|---|---|---|
| 3 | 1223 | 10 | 100 | 500, 475, 450 | 30 |
| 4 | 1224 | 10 | 100 | 500, 475, 450 | 30 |

It can be seen in FIG. 12, that all of the structures (structure 1-4) are formed inside the blank 1210. All of the structures 1221-1224 were tested before ultrasonic cleaning and found to be continuous and free from ablation product. Even though the structures were unobstructed, the blank 1210 was placed in an ultrasonic bath for 300 seconds. All of the structures (structure 1-5) were retested and found again to be continuous and free from blockage.

Although a few variations have been described in detail above, other modifications or additions are possible. For example, the variations described above largely describe embodiments in which the transparent material is moved as the focal region remains stationary. Additionally, the focal region in some embodiments is moved (for example, with beam scanners, moving optics, etc.) and the transparent material is held stationary.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

Values or ranges may be expressed herein as "about" and/or from/of "about" one particular value to another particular value. When such values or ranges are expressed, other embodiments disclosed include the specific value recited and/or from/of the one particular value to another particular value. Similarly, when values are expressed as approximations, by the use of antecedent "about," it will be understood that here are a number of values disclosed therein, and that the particular value forms another embodiment. It will be further understood that there are a number of values disclosed therein, and that each value is also herein disclosed as "about" that particular value in addition to the value itself. In embodiments, "about" can be used to mean, for example, within 10% of the recited value, within 5% of the recited value or within 2% of the recited value.

For purposes of describing and defining the present teachings, it is noted that unless indicated otherwise, the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety. Any patent, publication, or information, in whole or in part, that is said to be incorporated by reference herein is incorporated herein only to the extent that the incorporated material does not conflict with existing definitions, statements, or other disclosure material set forth in this document. As such, the disclosure as explicitly set forth herein supersedes any conflicting material incorporated herein by reference.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
a laser source configured to generate a laser beam;
a focus optic configured to converge the laser beam to a first focal region having a first width within a vent positioned within a transparent material;
one or more translation stages configured to move the first focal region from the vent and below a top surface of the transparent material along a first scan path; and
a controller configured to control at least one of the laser source and the one or more translation stages to form a continuous channel within the transparent material generally along the first scan path, wherein the continuous channel has the vent to outside the transparent material located at least at one end, wherein the controller is further configured to control the translation stage to move a second focal region having a second width from the vent along a second scan path that is substantially parallel to and separated by a separation distance from the first scan path to widen a width of the continuous channel, wherein the second width of the second focal region along the second scan path partially overlaps the first width of the first focal region along the first scan path.

2. The system of claim 1, wherein the controller is further configured to control the at least one translation stage to move the first focal region from inside the transparent material to outside the transparent material along a continuation of the first scan path to elongate the continuous channel within the transparent material generally along the continuation of the first scan path, such that the continuous channel has vents to outside the transparent material located at least at two ends.

3. The system of claim 1, wherein the separation distance is based upon a width of the focal region.

4. The system of claim 3, wherein the separation distance is substantially along one or more of 3 mutually orthogonal axes, including: a lateral (X) axis, a horizontal (Y) axis, and a vertical (Z) axis.

5. The system of claim 3, wherein the separation distance is between about 1 and 100 micrometers.

6. The system of claim 1, further comprising an ablation product removal system configured to remove ablation product from within the continuous channel.

7. The system of claim 6, wherein the ablation product removal system includes a solution, wherein the solution has a pH that is complementary or neutral to a pH of the ablation product.

8. The system of claim 6, wherein the ablation product removal system includes an ultrasonic cleaner.

9. The system of claim 1, wherein the laser beam is pulsed at a repetition rate of at least about 1 kHz.

10. The system of claim 9, wherein the laser beam has a pulse duration no greater than 1 nanosecond.

11. The system of claim 1, wherein the transparent material comprises at least one of: General Purpose Polystyrene (GPPS), Methylmethacrylate Acrylonitrile Butadiene Styrene (MABS), Styrene Acrylonitrile (SAN), Styrene Methyl Methacrylate (SMMA), Methacrylate Butadiene Styrene (MBS), Styrene-Butadiene (SB) Copolymer, Polycarbonate (PC), High Heat Polycarbonate (HH PC), Polyethylene Terephthalate (PET), Glycol-Modified Polyethylene Terephthalate (PET-G), Poly(Methyl Methacrylate) (PMMA), Polyethyleneimine (PEI), Polyethersulfone (PES), Polysulfone (PSU), Polypropylene Homopolymer (PP H), Random Copolymerized Polypropylene (PP R), Low-Density Polyethylene (LDPE), Polylactic Acid (PLA), glass, Styrene-Ethylene/Butylene-Styrene (SEBS), Thermoplastic Polyurethane (TPU), Thermoplastic Olefin (TPO), crystal, sapphire, and quartz.

12. The system of claim 1, wherein the focus optic is further configured to converge the laser beam at a numerical aperture of at least about 0.3.

13. The system of claim 1, wherein the laser beam has a wavelength in a range between about 400 and 4000 nanometers.

14. The system of claim 1, further comprising a vacuum system configured to introduce a vacuum to the continuous channel by way of one or more vents.

15. The system of claim 1, wherein the first scan path at a first surface of the transparent material is generally normal to the first surface of the transparent material.

\* \* \* \* \*